US009648019B2

(12) United States Patent
Khello et al.

(10) Patent No.: US 9,648,019 B2
(45) Date of Patent: May 9, 2017

(54) WI-FI INTEGRATION FOR NON-SIM DEVICES

(71) Applicant: TELEFONAKTIEBOLAGET L M ERICSSON (PUBL), Stockholm (SE)

(72) Inventors: Robert Khello, Norsborg (SE); Ping Chen, Shanghai (CN); Pengbo Duan, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 77 days.

(21) Appl. No.: 14/441,460

(22) PCT Filed: Apr. 15, 2015

(86) PCT No.: PCT/CN2015/076667
§ 371 (c)(1),
(2) Date: May 7, 2015

(87) PCT Pub. No.: WO2015/158263
PCT Pub. Date: Oct. 22, 2015

(65) Prior Publication Data
US 2016/0261596 A1    Sep. 8, 2016

Related U.S. Application Data

(60) Provisional application No. 61/979,791, filed on Apr. 15, 2014.

(51) Int. Cl.
*G06F 7/04* (2006.01)
*H04L 29/06* (2006.01)
(Continued)

(52) U.S. Cl.
CPC ...... *H04L 63/0892* (2013.01); *H04L 63/0823* (2013.01); *H04L 63/102* (2013.01); *H04W 12/06* (2013.01); *H04W 12/08* (2013.01)

(58) Field of Classification Search
CPC ............ H04L 63/0823; H04L 63/0892; H04L 63/102; H04W 12/06; H04W 12/08
(Continued)

(56) References Cited

U.S. PATENT DOCUMENTS 6,591,095 B1 * 7/2003 Palaniswamy ...... H04L 63/0823
455/410
6,795,701 B1 * 9/2004 Baker ...................... H04L 63/08
370/395.52
(Continued)

FOREIGN PATENT DOCUMENTS

CN          1434610 A      8/2003
CN        101106508 A      1/2008
(Continued)

OTHER PUBLICATIONS

International Search Report and the Written Opinion of the International Searching Authority dated Jun. 30, 2015, in International Application No. PCT/CN2015/076667, 12 pages.
(Continued)

*Primary Examiner* — Samson Lemma
(74) *Attorney, Agent, or Firm* — Rothwell, Figg, Ernst & Manbeck, P.C.

(57) ABSTRACT

The embodiments herein relate to a method performed by an AAA server (113) for enabling a non-SIM device (101*b*) to access a first network (100*a*) via a second network (100*b*). Based on a request for authorization to the first network (100*a*) from the non-SIM device (101*b*), the AAA server (113) obtains an identity associated with the non-SIM device (101*b*). The AAA server (113) transmits a request for a user profile associated with a user of the non-SIM device (101*b*) to the subscriber database (110). The request comprises the obtained identity for the non-SIM device (101*b*). The AAA server (113) receives, from the subscriber database (110), the requested user profile for the non-SIM device (101*b*). Based
(Continued)

on the received user profile, the AAA server (113) authorizes the non-SIM device (101b) to access the first network (100a) via the second network (100b).

28 Claims, 12 Drawing Sheets

(51) Int. Cl.
  *H04W 12/08* (2009.01)
  *H04W 12/06* (2009.01)
(58) Field of Classification Search
  USPC .............................................. 726/4; 713/168
  See application file for complete search history.

(56) References Cited

U.S. PATENT DOCUMENTS

| | | | | |
|---|---|---|---|---|
| 8,984,105 | B2* | 3/2015 | Vangala | H04W 12/06 709/220 |
| 2004/0162998 | A1* | 8/2004 | Tuomi | H04L 63/083 726/3 |
| 2006/0133319 | A1* | 6/2006 | Kant | H04L 63/10 370/331 |
| 2006/0155822 | A1* | 7/2006 | Yang | H04L 63/0272 709/216 |
| 2008/0161049 | A1* | 7/2008 | Lagnado | H04W 88/06 455/558 |
| 2009/0298467 | A1* | 12/2009 | Zohar | H04L 63/0884 455/411 |
| 2014/0148129 | A1* | 5/2014 | Lundstrom | H04W 8/26 455/411 |
| 2015/0172315 | A1* | 6/2015 | Hirst | H04L 63/0861 726/5 |

FOREIGN PATENT DOCUMENTS

| | | |
|---|---|---|
| CN | 101120602 A | 2/2008 |
| WO | 03/017125 A1 | 2/2003 |

OTHER PUBLICATIONS

3GPP, 3rd Generation Partnership Project; Technical Specification Group Services and System Aspects; 3GPP system to Wireless Local Area Network (WLAN) interworking; System description (Release 12), 3GPP TS 23.234 V12.0.0, 2014, 84 pages.

3GPP, 3rd Generation Partnership Project; Technical Specification Group Services and System Aspects; Architecture enhancements for non-3GPP accesses (Release 12), 3GPP TS 23.402 V12.6.0, 2014, 288 pages.

3GPP, 3rd Generation Partnership Project; Technical Specification Group Core Network and Terminals; Evolved Packet System (EPS); 3GPP EPS AAA interfaces (Release 12), 3GPP TS 29.273 V12.5.0, 2014, 156 pages.

\* cited by examiner

WI-FI INTEGRATION FOR NON-SIM DEVICES

CROSS REFERENCE TO RELATED APPLICATION(S)

This application is a 35 U.S.C. §371 National Phase Entry Application from PCT/CN2015/076667, filed Apr. 15, 2015, designating the United States, and also claims the benefit of U.S. Provisional Application No. 61/979,791, filed Apr. 15, 2014. The disclosures of both applications are incorporated herein in their entirety by reference.

TECHNICAL FIELD

Embodiments herein relate generally to an Application Server (AS), a method in the AS, an Authentication, Authorization, and Accounting (AAA) server and a method in the AAA server. More particularly the embodiments herein relate to enabling authorization of a non-Subscriber Identity Module (non-SIM) device to access a first network via a second network.

BACKGROUND

Wi-Fi is a technology which enables devices (e.g. wireless devices) to exchange data or to connect to e.g. the Internet wirelessly using radio waves. Wi-Fi is considered to be a key candidate for small cell solutions for mobile broadband heterogeneous networks. Wi-Fi is mainly specified by the Institute of Electrical and Electronics Engineers (IEEE) in the 802.11 family of specifications and updated by for example the Wi-Fi Alliance (WFA). There are currently intense activities in all corners of the world on how to integrate Wi-Fi with Third Generation Partnership Project (3GPP) networks and how to offer a "carrier Wi-Fi" solution where, in a similar fashion as any 3GPP radio access technology, Wi-Fi is integrated with the 3GPP Evolved Packet Core (EPC) and where access selection and traffic steering between 3GPP Radio Access Technologies (RATs) and Wi-Fi may be controlled through the network. Standardization and certification organizations like 3GPP, WFA, Global System for Mobile communications Association (GSMA) and Wireless Broadband Alliance (WBA) are producing material on carrier-integrated Wi-Fi and network equipment manufacturers are making products where Wi-Fi is integrated on different levels.

Current solutions for network integrated Wi-Fi offer a way to seamlessly access Wi-Fi and EPC, and to authenticate Wi-Fi use through SIM based authentication methods (e.g. Extensible Authentication Protocol-Subscriber Identity Module (EAP-SIM), Extensible Authentication Protocol-Authentication and Key Agreement (EAP-AKA) or EAP-AKA') towards the same network entities as are used for 3GPP. EAP is an authentication framework which supports multiple authentication methods. EAP is also applicable in scenarios where IP layer connectivity is not available. EAP-AKA' is a variant of EAP-AKA.

When it comes to network integrated Wi-Fi, there is a large interest to support Wi-Fi capable devices without Subscriber Identity Module (SIM) cards, i.e. tablet or laptop, and to manage the non-SIM devices in a similar way with existing capability as today for SIM based authentication and authorization.

SUMMARY

The objective of the embodiments herein is therefore to enable a non-SIM device to access a first network via a second network so that the communication for the non-SIM device is improved.

According to a first aspect, the object is achieved by a method performed by an AAA server for enabling a non-SIM device to access a first network via a second network. Based on a request for authorization to the first network from the non-SIM device, the AAA server obtains an identity associated with the non-SIM device. The AAA server transmits a request for a user profile associated with a user of the non-SIM device to the subscriber database. The request comprises the obtained identity for the non-SIM device. The AAA server receives, from the subscriber database, the requested user profile for the non-SIM device. Based on the received user profile, the AAA server authorizes the non-SIM device to access the first network via the second network.

According to a second aspect, the object is achieved by a method performed by an AS for enabling a non-SIM device to access a first network via a second network. The AS creates an association between a SIM device and the non-SIM device. The AS creates a user profile associated with the user of the non-SIM device. The AS transmits at least part of the user profile for the non-SIM device to a subscriber database and to a CA server to be used in authentication and authorization of the non-SIM device to access the first network via the second network.

According to a third aspect, the object is achieved by an AAA server for enabling a non-SIM device to access a first network via a second network. The AAA server is arranged to obtain, based on a request for authorization to the first network from the non-SIM device, an identity associated with the non-SIM device. The AAA server is arranged to transmit a request for a user profile associated with a user of the non-SIM device to the subscriber database. The request comprises the obtained identity for the non-SIM device. The AAA server is further arranged to receive, from the subscriber database, the requested user profile for the non-SIM device. The AAA server is arranged to, based on the received user profile, authorize the non-SIM device to access the first network via the second network.

According to a fourth aspect, the object is achieved by an AS for enabling a non-SIM device to access a first network via a second network. The AS is arranged to create an association between a SIM device and the non-SIM device and to create a user profile associated with the user of the non-SIM device. The AS is further arranged to transmit at least part of the user profile for the non-SIM device to a subscriber database and to a CA server to be used in authentication and authorization of the non-SIM device to access the first network via the second network.

Embodiments herein afford many advantages, of which a non-exhaustive list of examples follows:

An advantage of the embodiments is that they may provide a solution for non-SIM devices integration with 3GPP network besides the SIM and Universal Subscriber Identity Module (USIM) devices.

Another advantage of the embodiments herein may be related to that network integrated Wi-Fi is an emerging market. Considering different variants of end devices, the Wi-Fi access will bring more revenue to the operators, and increase the user experiences from an end user perspective.

Furthermore, an advantage of the embodiments herein may be related to that voice over Wi-Fi is a business case that many operators are very interested in and willing to invest in the Wi-Fi Integration with EPC. With non-SIM devices support, the Wi-Fi business growth may enable a boost.

An advantage would be that a non-SIM device may connect to a 3GPP network for an Internet Protocol (IP) Multimedia Subsystem (IMS) service or a service provided by the operator of the 3GPP network, as well as connecting to the Internet or to other service networks.

Furthermore, another advantage of the embodiments herein may be that the service for the non-SIM device may be charged (accounting) based on the International Mobile Subscriber Identity (IMSI) (e.g. a mobile phone) via the current Online Charging System (OCS) or the OFfline Charging System (OFCS). The subscription may also be managed in a subscriber database.

Thanks to the association between SIM and non-SIM devices and the user profile for the non-SIM device created by the AS, the subscriber database and CA server can use this information to generate certificates for the non-SIM devices. The certificates together with user profiles are provisioned by the AS to the AAA server and can be used by the AAA server to authorize the non-SIM device to access the first network via the second network. This improves communication for the non-SIM device.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 6 is a flow chart illustrating embodiments of a method performed by an AS.

FIG. 7 is a schematic block diagram illustrating embodiments of an AS.

The drawings are not necessarily to scale and the dimensions of certain features may have been exaggerated for the sake of clarity. Emphasis is instead placed upon illustrating the principle of the embodiments herein.

DETAILED DESCRIPTION

Currently, there is not yet any solution or standardization for non-SIM device support for Wi-Fi integration in 3GPP networks. More work has to be done related to the mobile device/3GPP device with SIM-based authentication over Wi-Fi via an AAA server and a subscriber database. A SIM device may be described as a mobile device or a 3GPP device. A non-SIM device may be described as a device without mobile subscription, i.e. without a SIM.

The overall requirements, architecture and procedures related to SIM and USIM based Wi-Fi integration has been specified in 3GPP.

One solution to obtain non-SIM device support for Wi-Fi integration in 3GPP networks is to use an AS for user registration, SIM and non-SIM devices association, and to use the subscriber database for authorization of users in Wi-Fi and see to that authorization is managed through the AAA server and the subscriber database. By using the subscriber database, there is no need to create any additional database for authorization. The 3GPP subscribers in an operator network already have all their information available through the subscriber database. The subscriber database comprises the subscription information for the IMSI (e.g. for a SIM device), for example, authorized Access Point Name (APN) list, subscribed Quality of Service (QoS), charging characteristics, etc. The subscription may be used for the non-SIM device associated with an IMSI (e.g. the SIM device), or a similar subscription may be defined for the non-SIM device. Additionally, the subscriber database may be used for keeping subscriber registration on both the Wi-Fi domain and the 3GPP domain as well as for keeping Wi-Fi subscriber data profiles updated in the same way as the subscriber database does for the 3GPP.

Figure 1A:
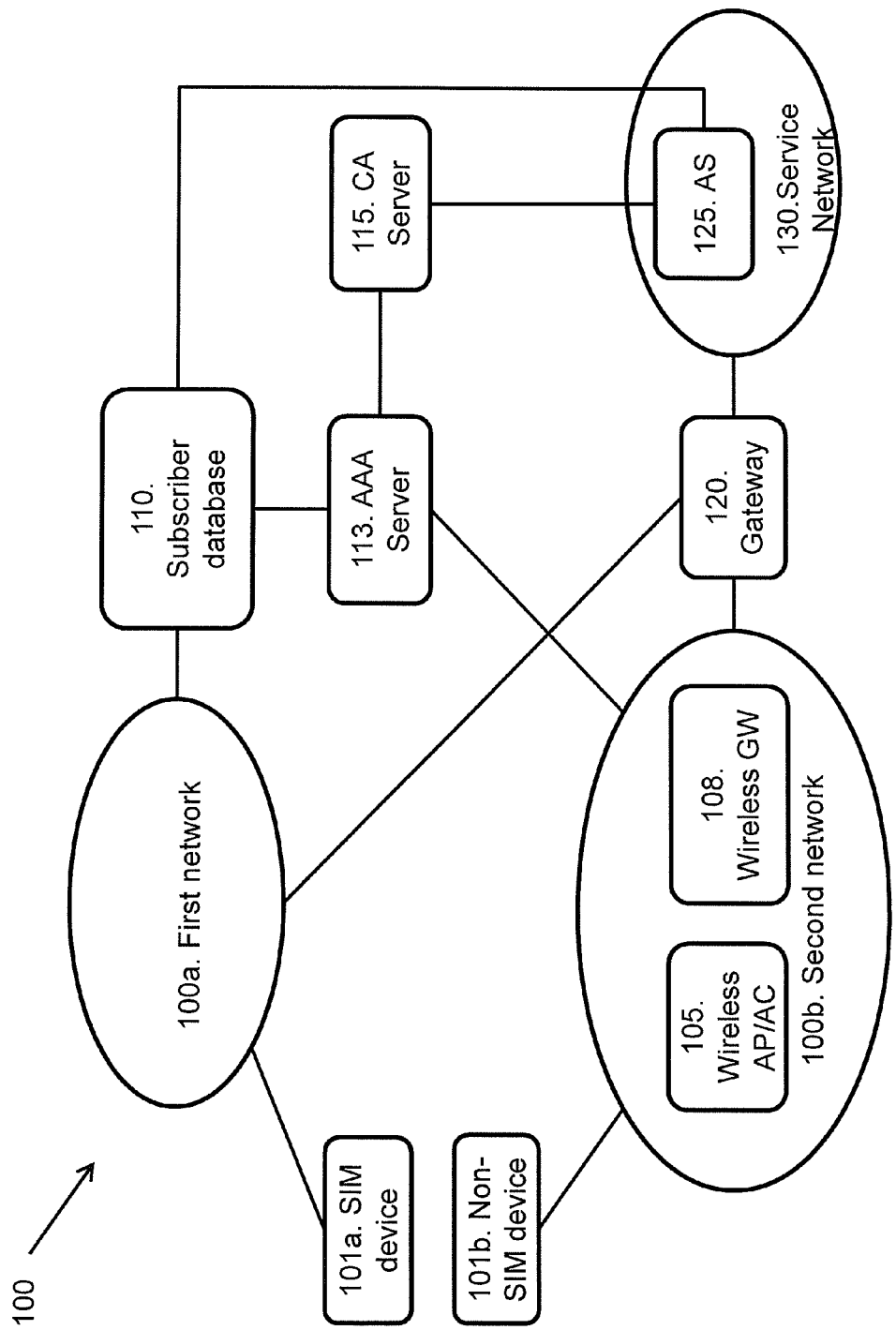
FIG. 1a is a schematic block diagram illustrating embodiments of a communications system.

FIG. 1a depicts an embodiment of a communications system 100 in which embodiments herein may be implemented. The communications system 100 may be seen as a combination of radio access networks and one or more core networks depending on the network configuration.

The communications system 100 comprises a first network 100a and a second network 100b. The first and second networks 100a, 100b may be seen as radio access networks. The first network 100a and the second network 100b may apply different access technologies. The first network 100a may be a 3GPP network, such as e.g. a WCDMA (Wideband Code Division Multiple Access) network, a GSM (Global System for Mobile Communications) network or a Long Term Evolution (LTE) network. A 3GPP network may also be referred to as an EPC network. The second network 100b may be a wireless network such as e.g. a Wi-Fi network.

The communications system 100 further comprises a SIM device 101a which may access at least the first network 100a. Even though the term SIM device 101a is used, the embodiments herein also apply to a USIM device. Thus, the term SIM device 101a is used herein when referring to both a SIM and USIM device. The SIM device 101a may be a wireless device comprising a SIM. The SIM device 101a may be a device with first network access capability and without second network access capability, or a device with access to both the first network 100a and the second network 100b. The SIM is an integrated circuit comprising an IMSI and a related key used to identify and authenticate subscribers on the SIM device 101a. The SIM may be embedded into a SIM card, and the SIM card may be comprised in the SIM device 101*a*. The SIM device 101*a* may be a device by which a subscriber may access services offered by a cellular or mobile operator's network and services outside the cellular or mobile operator's network to which the cellular or mobile operator's radio access network and core network provide access, e.g. access to the Internet.

Furthermore, the communications system 100 comprises a non-SIM device 101*b* which may access at least the second network 100*b*. Even though the term non-SIM device 101*a* is used, the embodiments herein also apply to a non-USIM device. Thus, the term non-SIM device 101*b* is used herein when referring to both a non-SIM device and non-USIM device. The non-SIM device 101*b* is a device with second network access capability and without first network access capability. The non-SIM device 101*b* is a wireless device without a SIM or where the SIM is inactivated. The non-SIM device 101*b* may be seen as being out of control of the mobile operator domain and that there is no user subscription for this mobile operator. Instead of a SIM and when the second network 100*b* is a Wi-Fi network, the non-SIM device 101*b* comprises a wireless network interface controller which enables the non-SIM device 101*b* to connect to the second network 100*b* when it is within its range and has permission to connect to it. The SIM device 101*a* may have at least one associated non-SIM device 101*b*. For example, a user may have a SIM device 101*a* such as a mobile phone. In addition to the SIM device 101*a*, the user may also have at least one non-SIM device 101*b* such as e.g. a tablet computer with Wi-Fi capability but without 3GPP network access capability. The SIM device 101*a* may also be referred to as a SIM UE or a SIM wireless device. Similarly, the non-SIM device 101*b* and may also be referred to as non-SIM UE or a non-SIM wireless device. For example, a SIM device 101*a* may have 3GPP network access capability and the non-SIM device 101*b* may have Wi-Fi access capability.

Each of the SIM device 101*a* and the non-SIM device 101*b* may be any device, mobile or stationary, enabled to communicate in the communications network 100, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). Each of the SIM device 101*a* and the non-SIM device 101*b* may be portable, pocket storable, hand held, computer comprised, or vehicle mounted devices, enabled to communicate voice and/or data, via the radio access network, with another entity, such as another device or a server.

Each of the SIM device 101*a* and the non-SIM device 101*b* may be used by a user. In some embodiments, the user may also be referred to as a subscriber.

Figure 1B:
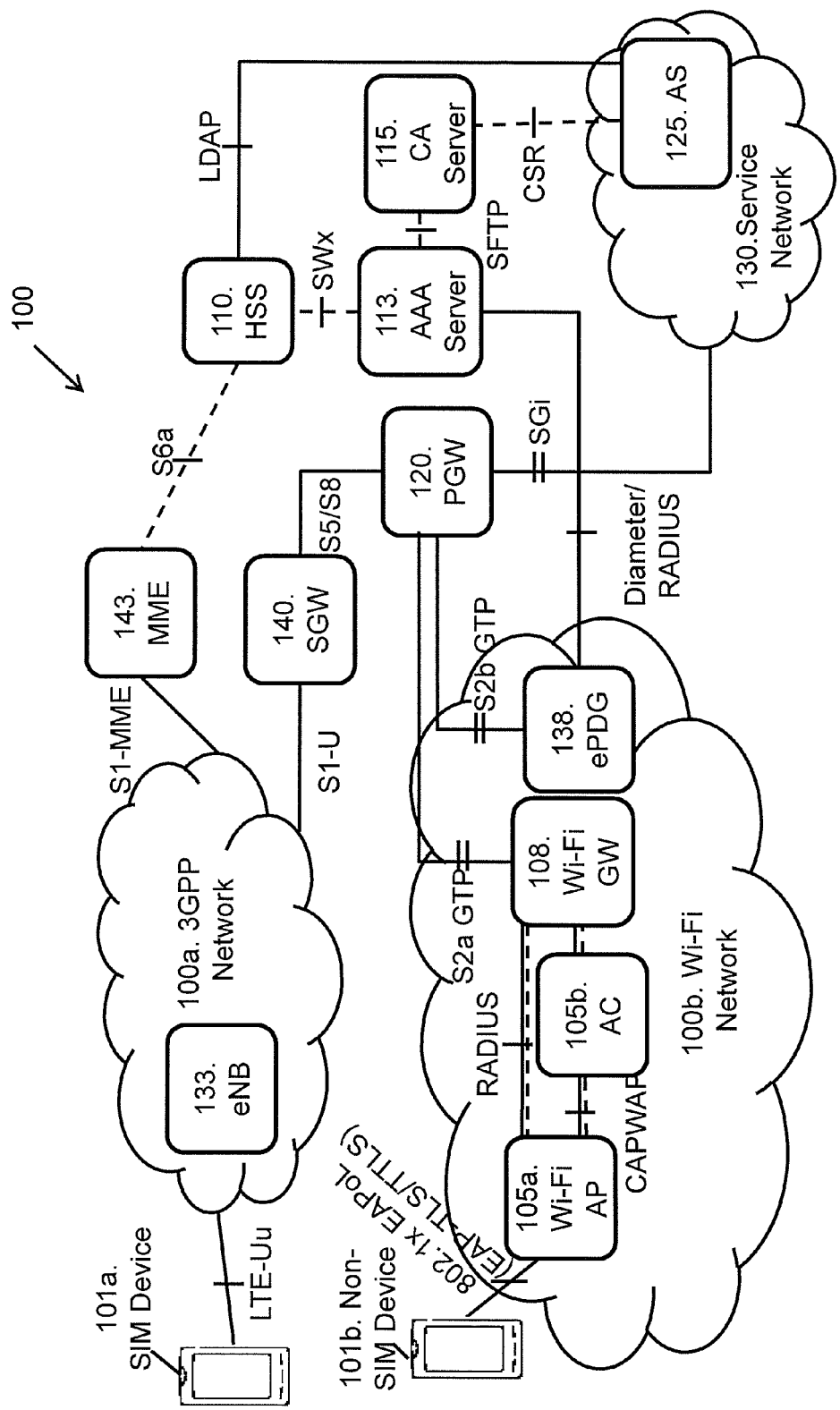
FIG. 1b is a schematic block diagram illustrating embodiments of a communications system.

The first network 100*a* comprises at least one first network node (not shown in FIG. 1*a*). Some examples of these first network nodes are seen in FIG. 1*b*, which will be described in more detail below. The first network node may be for example a Radio Network Controller (RNC), a NodeB (NB) or an evolved NodeB (eNB) etc.

The second network 100*b* may comprise at least one second network node, such as a wireless Access Point/Access Controller (wireless AP/AC) 105 and a wireless GateWay (wireless GW) 108. The term "wireless AP/AC" indicates that the node with reference number 105 may be either a wireless AP or an AC, that the node may be a node where the wireless AP and AC are co-located in one node or that there may be two nodes, i.e. one wireless AP and one AC. The wireless AP/AC 105 may allow the non-SIM device 101*b* to connect to e.g. a wired network such as e.g. the Internet, or other wireless devices using Wi-Fi or other related wireless standards. The wireless GW 108 may be responsible for routing packets between e.g. the second network 100*b* and a service network 130 such as e.g. the Internet. The wireless GW 108 may also be connected to the cellular or mobile operator's Core Network (CN). The second network 100*b* may comprise additional second network nodes in addition to the ones exemplified in FIG. 1*a*. Some of these additional second network nodes may be seen in FIG. 1*b*, which will be described in more detail below.

The communications system 100 further comprises a subscriber database 110, an AAA server 113, a Certificate Authority server (CA server) 115, a gateway 120 and an AS 125. The subscriber database 110 may be connected to at least one of the first network 100*a*, the AAA server 113 and the AS 125. The AAA server 113 may be connected at least one of to the subscriber database 110, the CA server 115 and the second network 100*b*. The CA server 115 may be connected to at least one of the AAA server 113 and the AS 125. The gateway 120 may be connected to at least one of the second network 100*b*, the first network 100*a*, and the service network 130. The AS 125 may be connected to at least one of the CA server 115, the subscriber database 110 and the gateway 120. The AS 125 may be located in the service network 130. The service network 130 will be described in more detail below.

The subscriber database 110 may be described as a database comprising information associated with subscribers that are authorized to access the first network 100*a* and subscribers that are authorized to access the second network 100*b*. The subscriber database 110 may comprise information associated with SIM cards issued by the SIM device 101*a* operator. Such information may be e.g. IMSI, Mobile Station International Subscriber Directory Number (MSISDN) etc. The subscriber database 110 may be for example a Home Location Register (HLR) or a Home Subscriber Server (HSS).

The AAA server 113 may be a node which handles which users are allowed access to which services (by performing both authentication and authorization of the users) and tracking the services that they have used (by performing accounting of the users). The AAA server 113 may for instance be related to at least one of the following protocols: the Mobile Application Part (MAP) protocol, the Remote Authentication Dial-In User Service (RADIUS) protocol and the Diameter protocol.

CA is short for certificate authority or certification authority. The CA server 115 is a node which issues certificates, e.g. digital certificates. The certificate certifies the ownership of a public key by the named subject of the certificate. This allows others (relying parties) to rely upon signatures or assertions made by the private key that corresponds to the public key that is certified. A CA server 115 is a trusted third party that is trusted by both the subject (owner) of the certificate and the party relying upon the certificate. CAs are characteristic of many Public Key Infrastructure (PKI) schemes. Trusted certificates are typically used to make secure connections to a server over the Internet, e.g. to the service network 130.

The gateway 120 may be described as providing connectivity from at least one of the SIM device 101*a* and the non-SIM device 101*b* to an external packet data network such as e.g. the service network 130. It is a point of exit and entry of traffic for the SIM device 101a and the non-SIM device 101b. The gateway 120 may be for example a Packet data network GateWay (PGW) or a Gateway General Packet Radio Service (GPRS) Support Node (GGSN).

The AS 125 may be described as comprising at least one application and enabling that the application can run regardless of what the application is or what it does. The AS 125 may provide the service for the SIM device 101a to associate the SIM device 101a with an identity of the non-SIM device 101b, service entitlement for the non-SIM devices 101b and also the distribution of digital certificates to the non-SIM devices 101b. The AS 125 may be located in a service network 130 or it may be located in a core network of the communications system 100. The AS 125 is used for device (e.g. devices such as a SIM device 101a, a non-SIM device 101b etc.) enrollment or onboarding.

The service network 130 may be referred to as an external network, an external IP network or a Packet Data Network (PDN) network. The SIM device 101a and the non-SIM device 101b may have access to one or more such service networks 130, but only one service network 130 is illustrated in FIG. 1a for the sake of simplicity. The service network 130 may provide data transmission services to the public. A service network 130 may be associated with a service network provider.

The subscriber database 110, the AAA server 113, the CA server 115, the gateway 120 and possibly the AS 125 may be seen as being comprised in the core network of the communications system 100.

FIG. 1b depicts an embodiment of the communications system 100 in which embodiments herein may be implemented. The solid lines between the entities in FIG. 1 illustrate the control plane and the user plane. The dotted lines between the entities in FIG. 1 illustrate only the control plane (i.e. signaling).

In FIG. 1b, the first network 100a is exemplified by a network applying 3GPP, i.e. a 3GPP network which in this example is an LTE network. The second network 100b is exemplified by a network applying Wi-Fi, i.e. it may be referred to as a Wi-Fi network Note that the first network 100a is not limited to a 3GPP network and that it may also be a non-3GPP network or for example a Wi-Fi network.

As also seen in FIG. 1a, the communications system 100 illustrated in FIG. 1b comprises a SIM device 101a and a non-SIM device 101b.

In FIG. 1b, the SIM device 101a may be served by a Radio Access Network (RAN) node such as an eNB 133 in the 3GPP network 100a, i.e. the eNB 133 is an example of a first network node. It should be understood that there may be more than one eNBs 133 that communicates with the SIM device 101a. The SIM device 101a may be connected to the 3GPP network 100a by using an LTE-Uu interface.

In the embodiment of the communications system 100 in FIG. 1b, the wireless AP/AC 105 is represented by a Wi-Fi AP 105a and an AC 105b. In FIG. 1b, the wireless GW 108 may be represented by a Wi-Fi GW 108.

As mentioned above, in addition to the Wi-Fi AP 105a and the Wi-Fi GW 108, the Wi-Fi network 100b in FIG. 1b comprises the AC 105b. The AC 105b is a second network node which may handle access control, usage monitoring and policy enforcement in the Wi-Fi network 100b. The AC 105b and the Wi-Fi AP 105a may be separate entities or they may be one entity, i.e. the AC 105b and Wi-Fi AP 105a may be co-located in one entity. In the co-located scenario the combined node may be referred to using the reference number 105.

The non-SIM device 101b may be connected to the Wi-Fi AP 105a using e.g. 802.1x EAPoL (EAP-TLS/TTLS). EAPoL is short for Extensible Authentication Protocol. TLS is short for Transport Layer Security and TTLS is short for Tunneled Transport Layer Security. The TLS protocol provides communications security over the Internet. The protocol allows client/server applications to communicate in a way that is designed to prevent eavesdropping, tampering, or message forgery. The Wi-Fi AP 105a may be connected to the AC 105b via a Control And Provisioning of Wireless Access Points protocol (CAPWAP) interface. The Wi-Fi GW 108 may be connected to the Wi-Fi AP 105a for example using an interface based on a RADIUS protocol.

The Wi-Fi network 100b may further comprises an evolved Packet Data Gateway (ePDG) 138. The ePDG 138 and the Wi-Fi GW 108 may be co-located in one node or they may be separate standalone nodes. The ePDG 138 is connected to the gateway 120 which is exemplified with a PGW 120 in FIG. 1b. The ePDG 138 may be connected to the PGW 120 for example using an S2b GTP interface, where GTP is short for GPRS Tunneling Protocol. The Wi-Fi GW 108 may also be connected to the PGW 120 for example using an S2a GTP interface. The PGW 120 may be seen as a gateway to the service network 130 which may be e.g. the Internet. The interface between the PGW 120 and the service network 130 may be a SGi interface.

The PGW 113 may be connected to a Serving GateWay (SGW) 140 for example via a S5/S8 interface. The SGW 140 may be connected to the 3GPP network 100a using e.g. the S1-U interface.

The communications system 100 further comprises a Mobility Management Entity (MME) 143. The MME 143 may be connected to the 3GPP network 100a using e.g. a S1-MME interface. The MME 143 may be connected to the subscriber database 110 exemplified with a HSS in FIG. 1b. The connection between the MME 143 and the HSS 110 may be referred to as an S6a interface.

The HSS 110 may be connected to the AAA server 113 for example via a SWx interface. The AAA server 113 may be connected to the ePDG 138 via e.g. a Diameter or a RADIUS interface. The AAA server 113 may be connected to the CA Server 115 for example using a Secure File Transfer Protocol (SFTP) interface.

The CA server 115 may be connected to the AS 125 for example via a Certificate Signing Request (CSR) interface. The CSR interface may be used to request a digital certificate from the CA server 115. The AS 125 may be connected to the HSS 105 for example via a Lightweight Directory Access Protocol (LDAP) interface. The LDAP interface may be used to provisioning the user profile into the subscriber database 110.

The SGW 140, the PGW 120, the MME 143, the HSS 120, the AAA server 113, the CA server 115 and possibly also the AS 125 may be seen as being comprised in a core network of the communications system 100. The AS 125 may be seen as being comprised in the core network or as being comprised in the Service network 130.

It should be noted that the links between the nodes in the communications system 100 may be of any suitable kind including either a wired or wireless link. The links may use any suitable protocol depending on type and level of layer (e.g. as indicated by the Open Systems Interconnection (OSI) model) as understood by the person skilled in the art.

Figure 2:
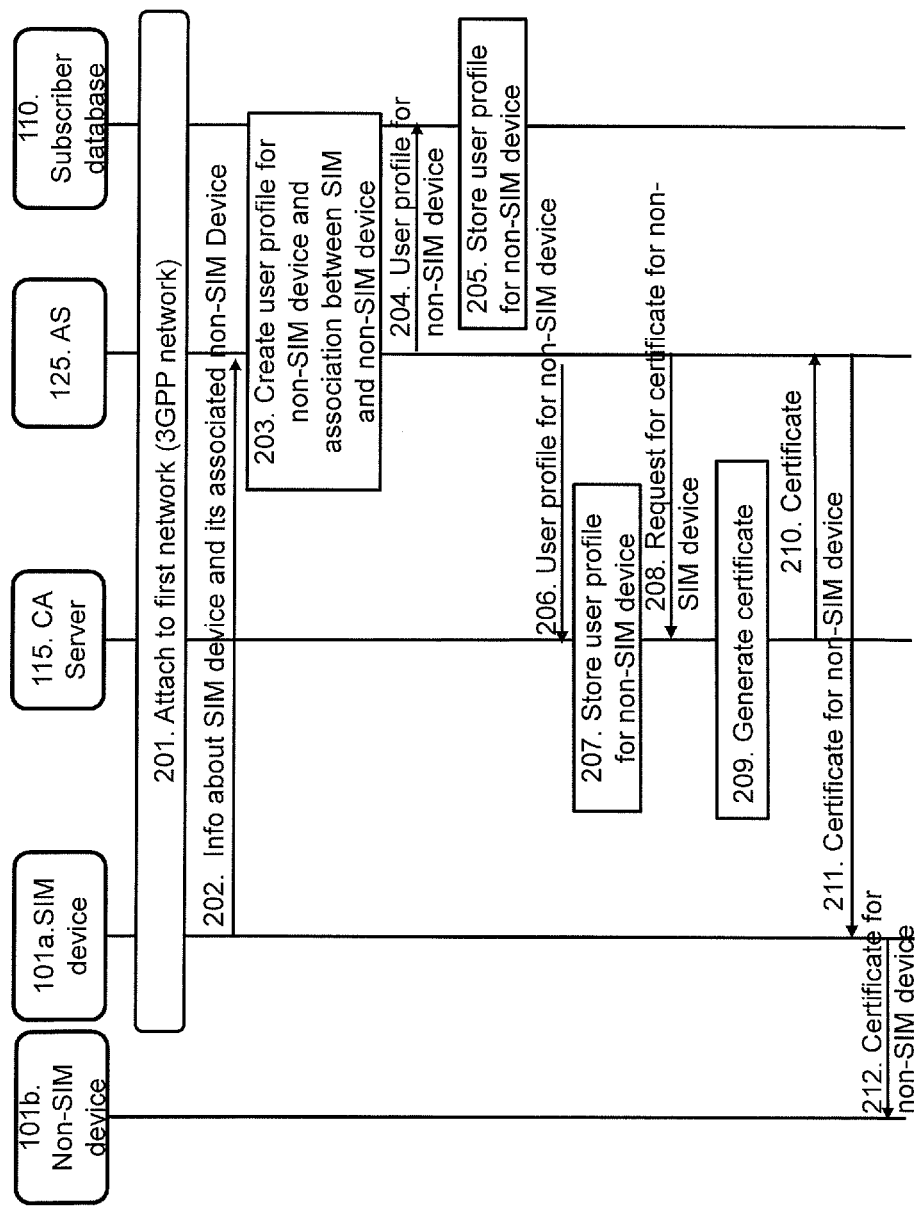
FIG. 2 is a signaling diagram illustrating embodiments of a method for service entitlement of a non-SIM device.

An example of a method for non-SIM device 101b service entitlement, according to some embodiments will now be described with reference to the signaling diagram depicted in FIG. 2. FIG. 2 uses the example embodiment of the communications system 100 as illustrated in FIG. 1a, but any other suitable embodiment of the communications system 100 is also applicable. An example of a service which the non-SIM device 101b is entitled to may be calling.

As mentioned above, the SIM device 101a may be associated to one or more non-SIM devices 101b. Before the method in FIG. 2 is performed, the SIM device 101a has obtained information indicating its associated non-SIM devices 101b. The information may be e.g. the type, user identity and the number of associated non-SIM devices 101b. The SIM device 101a may self-define the identity of the non-SIM device 101b, it may receive it from the non-SIM device 101b periodically or upon request etc. The method in FIG. 2 comprises at least some of the following steps, which steps may as well be carried out in another suitable order than described below:

Step 201

The SIM device 101a attaches to the first network 100a, e.g. a 3GPP network.

Step 202

The SIM device 101a authenticates itself with the AS 125 and may transmit information about itself and its associated non-SIM device(s) 101b to the AS 125. This step may be performed immediately after step 201 has been performed (i.e. step 201 is a trigger for step 202), or some time after step 201 has been performed. The information about the SIM device 101a may be for example the IMSI or MSISDN of the SIM device 101a and the information about the associated non-SIM device 101b may be for example a type, a user identity (self-defined by the user or owner of the SIM device 101a and the non-SIM device 101b) and the number of associated non-SIM devices 101b.

Seen from the perspective of the AS 125, the AS 125 receives, from the SIM device 101a, information about the SIM device 101a and information about a non-SIM device 101b associated with the SIM device 101a.

Step 203

Based on the received information about the associated non-SIM device 101b, the AS 125 may create or generate a user profile for the non-SIM device 101b and an association between the SIM device 101a and the non-SIM device 101b. The association may be between the SIM device 101a and the user profile for the non-SIM device 101b.

A user profile may be related to the user or subscriber of the non-SIM device 101b. The user profile may comprise e.g. user related data, group lists, user service related information, user location information, charging information etc. The user profile may also be referred to as user data, profile data etc. In some embodiments, the user profile may be seen as comprising user data. The terms user profile, user data and profile data is used interchangeably herein.

A policy may be defined by an operator. The policy may be that one SIM-device 101a can be associated with a number of non-SIM devices 101b. The number of associated non-SIM devices 101b may be limited. The limit may be defined per operator. As such, the association may be done first and following with the non-SIM device 101b user profile creation (e.g. Wi-Fi user profile creation) etc.

In case the SIM device 101a is associated with a plurality of non-SIM devices 101b, the association between the SIM device 101a and each of the non-SIM devices 101b may be organized in for example a table, a list or any other suitable structure for organizing information. Such table is exemplified in table 1 below, where the SIM device 101a is associated with four non-SIM devices A, B, C and D:

TABLE 1

| SIM device 101a | Non-SIM device 101b |
| --- | --- |
| SIM device | User profile A - non-SIM device A |
| SIM device | User profile B - non-SIM device B |
| SIM device | User profile C - non-SIM device C |
| SIM device | User profile D - non-SIM device D |

Step 204

The AS 125 may transmit information indicating the user profile for the non-SIM device 101b to the subscriber database 110.

Seen from the perspective of the subscriber database 110, the subscriber database 110 receives, from the AS 125, information indicating the user profile for the non-SIM device 101b.

Step 205

The subscriber database 110 may store information indicating the user profile for the non-SIM device 101b. In addition to the user profile for the non-SIM device 101b, the subscriber database 110 also comprises the user profile for the SIM device 101a. The user profile for the SIM device 101a has previously been stored by the subscriber database 110, for example in relation to the previous attachment to the first network 100a made by the SIM device 101a.

The AS 125 might need to provision user information for the non-SIM device 101b and the association with the SIM device 101a (e.g. the IMSI of the SIM device 101a) and user/peer identity (e.g. the non-SIM device 101b) in the AAA server 113 after step 205. It may be optional for an EAP-TLS authentication method. The peer identity for EAP-TLS may be statically mapped to an IMSI. The provisioning of the user information may be needed for an EAP-TTLS/PEAP authentication method. PEAP is short for Protected Extensible Authentication Protocol or Protected EAP. The user password is required.

Step 206

The AS 125 may transmit, to the CA server 115, information indicating the user profile for the non-SIM device 101b. The user profile may be used in authentication and authorization of the non-SIM device 101b to access the first network 100a via the second network 100b. In some embodiments, it may be information indicating user data comprised in the user profile that is transmitted to the CA server 115.

Seen from the perspective of the CA server 115, the CA server 115 receives, from the AS 125, information indicating the user data for the non-SIM device 101b.

The user profile may comprise user data. As mentioned earlier, the user data may also be referred to as profile data. In some embodiments, the term user profile, user data and profile data are used interchangeably. In some embodiments, the AS 125 transmits the whole user profile for the non-SIM device 101b instead of only the user data. In other words, the AS 125 transmits at least part of the user profile to the CA server 115.

In addition, the AS 125 may further transmit information indicating the association between the non-SIM device 101b (e.g. the user identity or the device identity) and the SIM device 101a (e.g. IMSI), and non-SIM user information (e.g. the password for the EAP-TTLS/PEAP authentication method, the user policy, etc.) to the AAA server 113 or any other external database.

Step 207

The CA server 115 may store the received user data for the non-SIM device 101b.

Step 208

The AS 125 may request the CA server 115 for certificate generation for the non-SIM device 101b, e.g. a digital certificate. In other words, the AS 125 transmits a request for a certificate for the non-SIM device 101b to the CA server 115. Seen from the perspective of the CA server 115, the CA server 115 receives a request for a certificate for the non-SIM device 101b from the AS 125.

Step 209

The CA server 115 generates the requested certificate(s) for the non-SIM device 101b. The certificate may be a digital certificate and it may be used for an EAP-TLS/TTLS authentication procedure.

The certificate may be referred to as a public key certificate or a digital certificate. The certificate comprises information about the owner's identity under the typical Public Key Infrastructure (PKI) domain, and this is used to provide a secure communication for non-SIM devices 101b to e.g. the operator's 3GPP network.

Step 210

The CA server 115 transmits the generated certificate to the AS 125 as requested in step 208. Seen from the perspective of the AS 125, the AS 125 receives, from the CA server 115, a certificate for the non-SIM device 101b.

Step 211

The AS 125 may transmit the certificate for the non-SIM device 101b to the SIM device 101a. The SIM device 101a may store the certificate after receipt.

In addition to information indicating the certificate, the AS 125 may transmit information such as subscription information associated with the non-SIM device 101b, an identity of the user of the non-SIM device 101b etc.

Step 212

The SIM device 101a may transmit the certificate to the non-SIM device 101b for example via Bluetooth. The non-SIM device 101b may use the certificate for PKI authentication, i.e. EAP-TLS authentication procedure.

Figure 3:
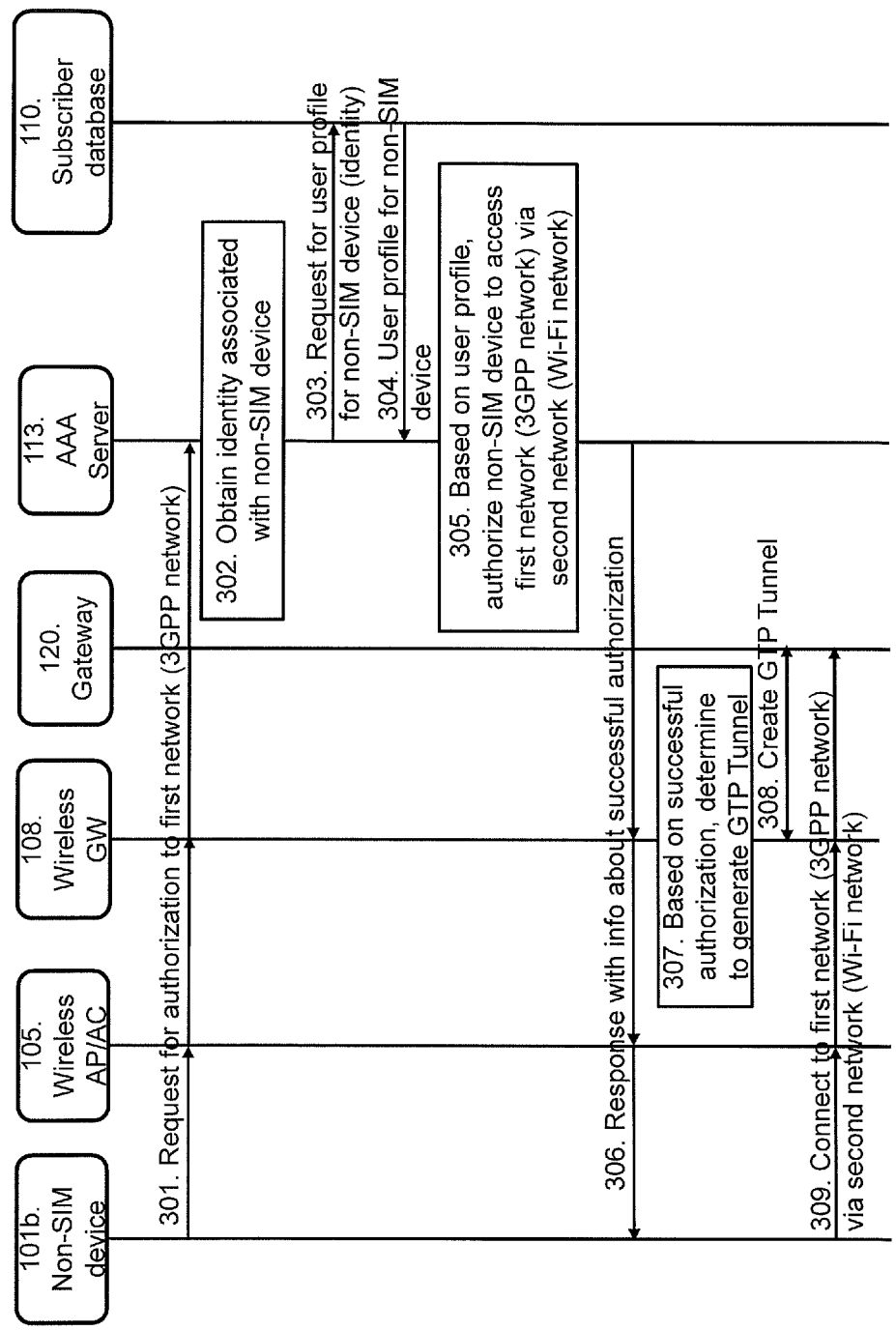
FIG. 3 is a signaling diagram illustrating embodiments of a method for access attachment of a non-SIM device Wi-Fi after the non-SIM device has been entitled.

An example of a method for non-SIM device 101b access attachment to the first network 100a after the non-SIM device 101b has been entitled, according to some embodiments will now be described with reference to the signaling diagram depicted in FIG. 3. The method shown in FIG. 2 is performed before the method in FIG. 3. The method in FIG. 2 may take place only once, and the method in FIG. 3 may take place several times, e.g. once for each non-SIM device 101b or every time the non-SIM device 101b attaches to the second network 100b. The non-SIM device 101 has been entitled to a service such as e.g. a Wi-Fi calling service. FIG. 3 uses the example embodiment of the communications system 100 as illustrated in FIG. 1a, but any other suitable embodiment of the communications system 100 is also applicable. The method in FIG. 3 comprises at least some of the following steps, which steps may as well be carried out in another suitable order than described below:

Step 301

The non-SIM device 101b may transmit a request message to the AAA server 113. The request message may be a request for authorization to access the first network 100a, e.g. the 3GPP network, through the second network 100b, e.g. the Wi-Fi network. The request may comprise information identifying the non-SIM device 101b. The request may further be a request for integration with the first network 100a so that the non-SIM device 101b may enjoy the IMS services provided by the operator, e.g. Voice over Wi-Fi.

Step 302

The AAA server 113 may obtain an identity associated with the non-SIM device 101b. The AAA server 113 may obtain the identity internally within a local database comprised in the AAA server 113 or from any other external database. The AAA server 113 obtains the identity based on a request from the non-SIM device 101b, e.g. the request in step 301.

Step 303

The AAA server 113 may transmit a request message to the subscriber database 110. The request message may be a request for a user profile for the non-SIM device 101b. The request message may comprise information identifying the non-SIM device 101b, i.e. the identity obtained in step 302.

Seen from the perspective of the subscriber database 110, the subscriber database 110 receives a request for the user profile for the non-SIM device 101b from the AAA server 113.

Step 304

The subscriber database 110 may transmit the user profile for the non-SIM device 101b back to the AAA server 113, as requested in step 303.

The subscriber database 110 may comprise user profiles for both the SIM device 101a and the non-SIM device 101b. The subscriber database 110 may be e.g. a HSS or a HLR.

Seen from the perspective of the AAA server 113, the AAA server 113 receives, from the subscriber database 110, the user profile for the non-SIM device 101b as requested by the associated identity of the SIM device 101a.

Step 305

Based on the user profile, the AAA server 113 may authorize the non-SIM device 101b to access the first network 100a (e.g. the 3GPP network) via the second network 100b (e.g. the Wi-Fi network). In other words, the connection to the first network 100a is managed by the second network 100b.

Step 305 may also involve that the AAA server 113 determines that the user profile is associated with a device without a SIM.

Step 306

The AAA server 113 may transmit a response message to the non-SIM device 101b. The response message may comprise information indicating that the non-SIM device 101b was successfully authorized to access the first network 100a via the second network 100b. The response message may be a response to the request sent in step 301. The response message may be sent via at least one of the wireless GW 108 and the wireless AP/AC 105.

From the non-SIM device 101b perspective, it has been authorized to access the second network 100b, and it has also been allowed to access the first network 100a via an S2a/S2b tunnel between the Wi-Fi GW 108/ePDG 138 and the PGW 120. The term Wi-Fi GW 108/ePDG 138 may refer to a node where the Wi-Fi GW 108 and the ePDG 138 are co-located in one node.

Step 307

Based on the successful authorization, the wireless GW 108 may determine to generate a GTP Tunnel. GTP may be described as a virtual connection between two gateways, e.g. the wireless GW 108 and the gateway 120, and may be used for information exchange.

Step 308

The wireless GW 108 may generate, in cooperation with the gateway 120, the GTP tunnel.

Step 309

The non-SIM device 101b may access the first network 100a via the second network 100b, by using the GTP tunnel. For example, the non-SIM device 101b may access the 3GPP network 100a or the service network 130 via the Wi-Fi network 100b. The connection to the first network 100a may involve at least one of the wireless GW 108 and the wireless AP/AC 105. As a result, the non-SIM device 101b may access services provided by the first network 100a (e.g. the 3GPP network) even though the device does not have a SIM or the SIM is inactivated, i.e. it is not initially enabled to directly connect to the second network 100b. When the non-SIM device 101b transmits data, the data may go from the non-SIM device 101b, via at least one of the wireless AP/AC 105 and the wireless GW 108. The wireless GW 108 tunnels the data through the GTP tunnel to the gateway 120 comprised in the second network 100b, and the gateway 120 transmits the data further to the appropriate receiver.

After at least some of the steps of FIGS. 2 and 3 have been performed, the non-SIM device 101b may attach to the first network 100a via the second network 100b even though the non-SIM device 101b does not have a SIM. In other words, the non-SIM device 101b may access services provided by the first network 100a even though the non-SIM device 101b does not have a SIM.

Figure 4:
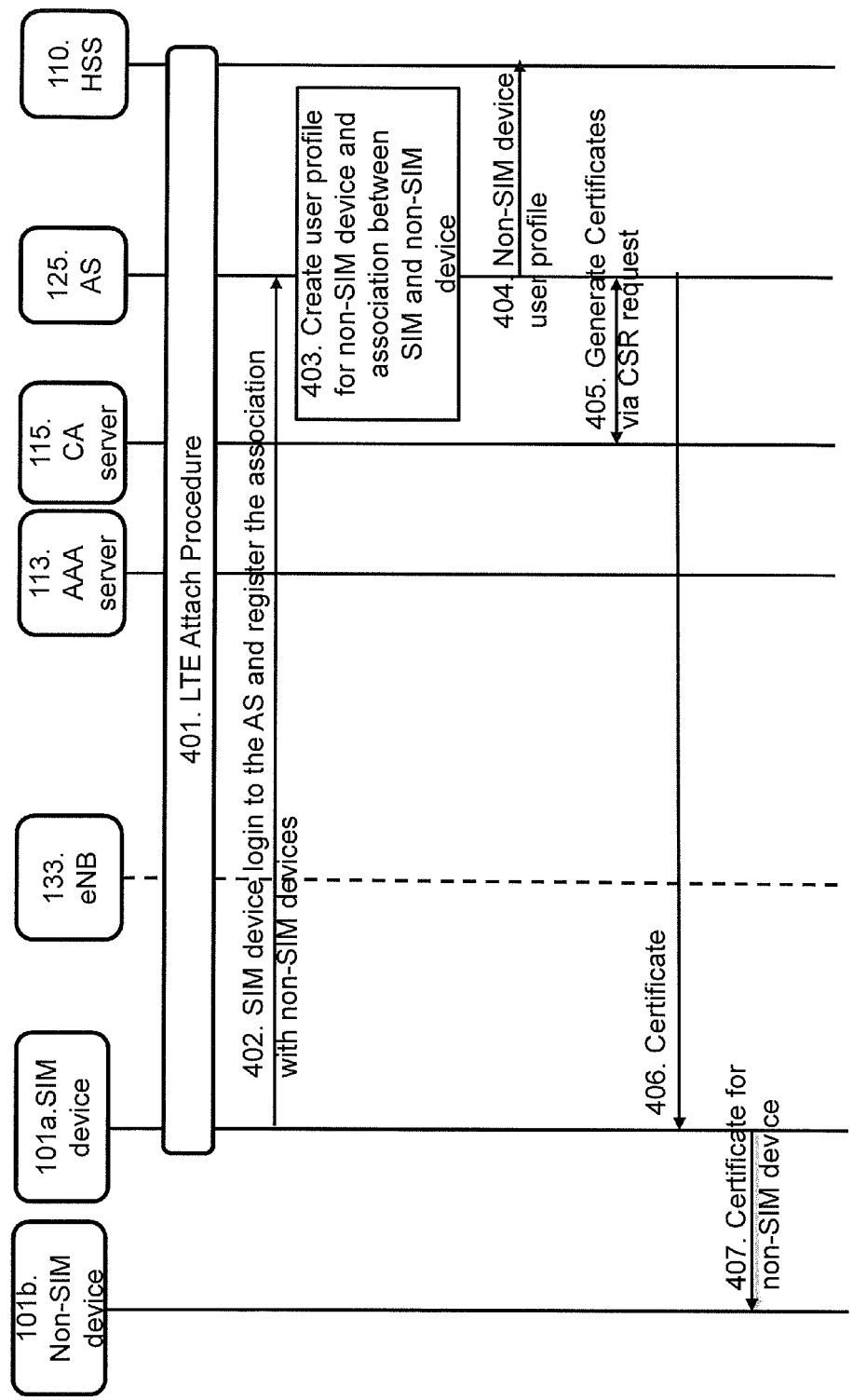
FIG. 4 is a signaling diagram illustrating embodiments of a method for device registration and association with non-SIM devices.

The method for non-SIM device 101b access attachment to the first network 100a after the non-SIM device 101b has been entitled, according to some embodiments will now be described with reference to the signaling diagram depicted in FIG. 4. FIG. 4 uses an example where the first network 100a is an LTE network, i.e. a 3GPP network, and where the second network 100b is a Wi-Fi network. The procedure illustrated in FIG. 4 may also be referred to as a procedure for SIM device registration and association with non-SIM devices. FIG. 4 is similar to FIG. 2. In FIG. 4, the first network 100a is exemplified with an LTE network and the subscriber database 110 is exemplified with a HSS. FIG. 2 is more general than FIG. 2 where the first network 100a is a 3GPP network and the subscriber database 110 is a general subscriber database. The SIM device 101a (as a trusted device for the operator domain) may have to initiate with the registration procedure, assuming that the SIM device 101a has establish an LTE connection with the operator network. In FIG. 4, the co-located MME 143 and SGW 140 are indicated with a dotted box. FIG. 4 uses the example embodiment of the communications system 100 as illustrated in FIG. 1b, but any other suitable embodiment of the communications system 100 is also applicable. The method in FIG. 4 comprises at least some of the following steps, which steps may be performed in any suitable order than described below:

Step 401

This step corresponds to step 201 in FIG. 2. The SIM device 101a performs an LTE attach procedure. As mentioned above, LTE is an example of the first network 100a in FIG. 4.

Step 402

This step corresponds to step 202 in FIG. 2. The SIM device 101a may log on to the AS 125 for service entitlement for the non-SIM device 101b and registers the association with its non-SIM device(s) 101b. The AS 125 may authenticate the user of the SIM device 101a via EAP-AKA over the HyperText Transfer Protocol Secure (HTTPS) protocol interacting with the AAA server 113, or using a Short Message Service (SMS) to send a onetime password for the authentication of the SIM device 101a. The registration of the association between the SIM device 101a and its associated non-SIM device 101b may be transmitted in the form of a request message, i.e. a request for registration.

Step 403

This step corresponds to step 203 in FIG. 2. The AS 125 may create an association between the SIM device 101a (e.g. the user ID of the SIM device 101b) and the non-SIM device 101b, e.g. between the SIM device 101 and the user profile for the non-SIM device 101b.

In some embodiments, this step 403 may also involve creating the user profile for the non-SIM device 101b.

When receiving the request from the SIM device 101a in step 402, the AS 125 may authenticate the SIM device 101a and create the association between the SIM and non-SIM devices 101a, 101b (e.g. associating their respective user identities). Consequently, a virtual IMSI, default APN and PDN parameters may be created for the associated non-SIM device 101b. The user data for the non-SIM device 101b may be populated to the HSS 110 as part of a non-3GPP user profile in step 404 described below.

After being authenticated, the SIM device 101a may apply for service entitlement for the non-SIM device 101b. Consequently, the subscription for the non-SIM device 101b may be provisioned to the HSS 110. Both the SIM device 101a and the non-SIM device 101b have subscriptions in the HSS 110. The subscription for the non-SIM device 101b may be different from the subscription for the SIM device 101a based on the operator's policy. The following two example options a) and b) may be used:

a) Creating a virtual IMSI and user subscription which is different from the existing EPC/GRPS subscription. Each non-SIM device 101b may have a virtual IMSI. Each subscription may define a different QoS profile, charging characteristics, APN restriction, etc.

b) Create a different APN for the non-SIM device 101b within the existing EPC/GRPS subscription, and the APN subscription may comprise an indication for each of the non-SIM device 101b and the SIM device 101a, depending on the type of device. Each subscription may define different QoS profiles, charging characteristics, APN restrictions, etc.

Step 404

This step corresponds to steps 204 and 205 in FIG. 2. The AS 125 may provision the user profile of the non-SIM device 101b (the profile created in step 403) into the HSS 110. In other words, the AS 125 sends information indicating the user profile of the non-SIM device 101b to the HSS 110.

Step 405

This step corresponds to steps 206, 207 208, 209 and 210 in FIG. 2. The AS 125 may populate the non-SIM user data to the CA Server 115. The CA server 115 may use the non-SIM user data for certificate generation in step 406. The CA server 115 generates one or more certificate for the non-SIM device 101b upon request from the AS 125. The CA server 115 may transmit the certificate to the AS 125 via a CSR request. The CRC request may be a request for a digital certificate.

Step 406

This step corresponds to step 211 in FIG. 2. The AS 125 may distribute the certificate that was generated in step 406 to the SIM device 101a. The AS 125 may send generated certificates and related information in a response message back to the SIM device 101a. The response may be a response to the message sent in step 402. The related information may be user information and operator's policy, such as e.g. user identity and user password if PEAP or EAP-TTLS is used, subscription information, including subscription validation time. The CA server 115 may download the certificate for the non-SIM device 101b to the AAA server 113. CA server 115 may publishes the certificate in the form of a Certificate Revocation List (CRL) to the AAA server 113 periodically, which may be used by the AAA server 113 during the EAP-TLS procedure for certificates validation described with reference to FIG. 5 below.

Step 407

This step corresponds to step 212 in FIG. 2. The SIM device 101a may transmit the certificate to the non-SIM device 101b.

Figure 5:
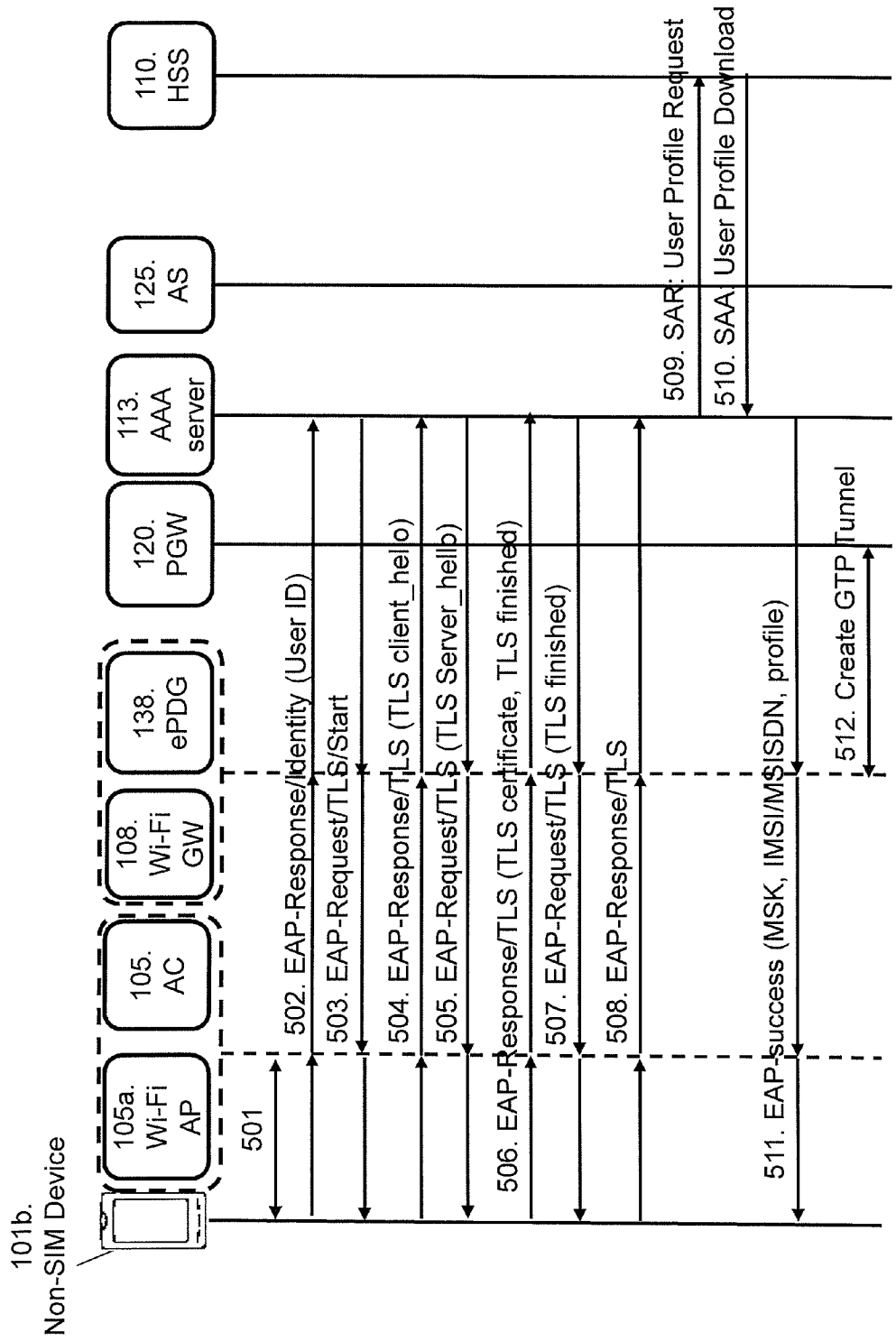
FIG. 5 is a signaling diagram illustrating embodiments of a method for Wi-Fi authentication.

The method for Wi-Fi authentication, according to some embodiments will now be described with reference to the signaling diagram depicted in FIG. 5. FIG. 5 uses an example where the first network 100a is an LTE network, i.e. a 3GPP network, and where the second network 100b is a Wi-Fi network. At least one of the steps in FIG. 5 is performed before the start of FIG. 5. In FIG. 5, the co-located Wi-Fi AP 105a and AC 105b are indicated with a dotted box and the co-located Wi-Fi GW 108 and ePDG 138 is also indicated with a dotted box. When FIG. 5 is described above, the term Wi-Fi AP 105a/AC 105b is used to refer to the co-located Wi-Fi AP 105a and AC 105b. FIG. 4 uses the example embodiment of the communications system 100 as illustrated in FIG. 1b, but any other suitable embodiment of the communications system 100 is also applicable. The method in FIG. 5 comprises at least some of the following steps, which steps may be performed in any suitable order than described below:

Step 501

This step corresponds to step 301 in FIG. 3. The non-SIM device 101b transmits a request for authorization to access the 3GPP network 100a to the Wi-Fi AP 105a/AC 105b.

Step 502

This step corresponds to step 301 in FIG. 3. The non-SIM device 101b may transmit an EAP-Response message to the AAA server 113, indicated as EAP-Response/Identity (e.g. the user ID identifying the non-SIM device 10b) in FIG. 5. The EAP-Response may be transmitted via at least one of the Wi-Fi AP 105a, the AC 105b, the Wi-Fi GW 108 and the ePDG 138 before it reaches the AAA server 113. The EAP-Response message may comprise an identity associated with the user of the non-SIM device 101b, e.g. a user ID.

Step 503

This step corresponds to step 301 in FIG. 3. The AAA server 113 may transmit an EAP-Request message to the non-SIM device 101b, indicated as EAP-Request/TLS/Start in FIG. 5. TLS refers to an EAP-TLS authentication procedure. Start refers to the TLA conversation with the authenticator, i.e. the AAA server 113. The EAP-Request may be transmitted via at least one of the Wi-Fi AP 105a, the AC 105b, the Wi-Fi GW 108 and the ePDG 138 before it reaches the non-SIM device 101b.

Step 504

This step corresponds to step 301 in FIG. 3. The non-SIM device 101b may transmit an EAP-Response message to the AAA server 113, indicated as EAP-Response/TLS (TLS client_hello) in FIG. 5. TLS client_hello is a handshake message transmitted between the end device and authenticator (i.e. the AAA server 113). The EAP-Response message may be transmitted via at least one of the Wi-Fi AP 105a, the AC 105b, the Wi-Fi GW 108 and the ePDG 138 before it reaches the AAA server 113. The EAP-Response message in step 504 may be a response to the request sent in step 503.

Step 505

This step corresponds to step 301 in FIG. 3. The AAA server 113 may transmit an EAP-Request message to the non-SIM device 101b, indicated as EAP-Request/TLS (TLS Server_hello) in FIG. 5. The TLS Server-hello is a handshake message. The EAP-Request message may be transmitted via at least one of the Wi-Fi AP 105a, the AC 105b, the Wi-Fi GW 108 and the ePDG 138 before it reaches the non-SIM device 101b.

Step 506

This step corresponds to step 301 in FIG. 3. The non-SIM device 101b may transmit an EAP-Response message to the AAA server 113, indicated as EAP-Response/TLS (TLS certificate, TLS finished) in FIG. 5. The TLS certificate and TLS finished is associated with a handshake message. The EAP-Response message may be transmitted via at least one of the Wi-Fi AP 105a, the AC 105b, the Wi-Fi GW 108 and the ePDG 138 before it reaches the AAA server 113. The EAP-Response message in step 506 may be seen as a response to the request sent in step 505.

Step 507

This step corresponds to step 301 in FIG. 3. The AAA server 113 may transmit an EAP-Request message to the non-SIM device 101b, indicated as EAP-Request/TLS (TLS finished) in FIG. 5. The "TLS finished" indicates that the handshake is finished. The EAP-Request message may be transmitted via at least one of the Wi-Fi AP 105a, the AC 105b, the Wi-Fi GW 108 and the ePDG 138 before it reaches the non-SIM device 101b.

Step 508

This step corresponds to step 301 in FIG. 3. The non-SIM device 101 may transmit an EAP-Response message to the AAA server 113, indicated as EAP-Response/TLS in FIG. 5. The TLS indicates that the EAP authentication type is EAP-TLS. The response message in step 508 may be seen as a response to the request message sent in step 507. The EAP-Response message may be transmitted via at least one of the Wi-Fi AP 105a, the AC 105b, the Wi-Fi GW 108 and the ePDG 138 before it reaches the AAA server 113.

Steps 501-508 above may be described as an EAP-TLS authentication procedure.

Step 509

This step corresponds to step 303 in FIG. 3. The AAA Server 113 may transmit a user profile request message to the HSS 110. The user profile request message may be sent in a Server-Assignment-Request (SAR) message.

Step 510

This step corresponds to step 304 in FIG. 3. The HSS 510 may transmit a user profile download message to the AAA server 113. The user profile download may be sent in a Server-Assignment-Answer (SAA) message.

In steps 509 and 510 described above, the AAA server 113 obtains the associated IMSI from the peer or user identity during an EAP-TLS procedure. The AAA server 113 may send a SAR request to the HSS 110 for downloading the user profile for the non-SIM device 101b. The AAA server 113 may use the user profile for authorization of the non-SIM device 101b.

Step 511

This step corresponds to step 306 in FIG. 3. The AAA server 113 may transmit an EAP-success message to the non-SIM device 101b. The EAP-success message may comprise a Master Session Key (MSK), IMSI, MSISDN, user profile etc. associated with the non-SIM device 101b. The EAP-success message may be sent via at least one of the Wi-Fi AP 105a, the AC 105b, the Wi-Fi GW 108 and the ePDG 138 before it reaches the non-SIM device 101b. The EAP-success message may indicate that the EAP has been successful.

Step 512

This step corresponds to step 308 in FIG. 3. The Wi-Fi GW 108, the ePDG 138 and the PGW 120 cooperates in creating a GTP tunnel between the Wi-Fi GW 108/ePDG 138 and the PGW 120, i.e. building a connection for the non-SIM device 101b towards the 3GPP network 100a. For trusted Wi-Fi, the GTP tunnel may be an S2a tunnel between the Wi-Fi GW 108 and the PGW 120. For untrusted Wi-Fi, the GTP tunnel may be an S2b tunnel between the ePDG 138 and the PGW 120. Trusted Wi-Fi access refers to operator-built Wi-Fi access with over-the-air encryption and a secure authentication method. Untrusted Wi-Fi access refers to any type of Wi-Fi access that is either not under control of the operator (e.g. public open hotspot, subscriber's home WLAN, etc.) or that does not provide sufficient security (e.g. authentication, encryption, etc.).

Figure 6:
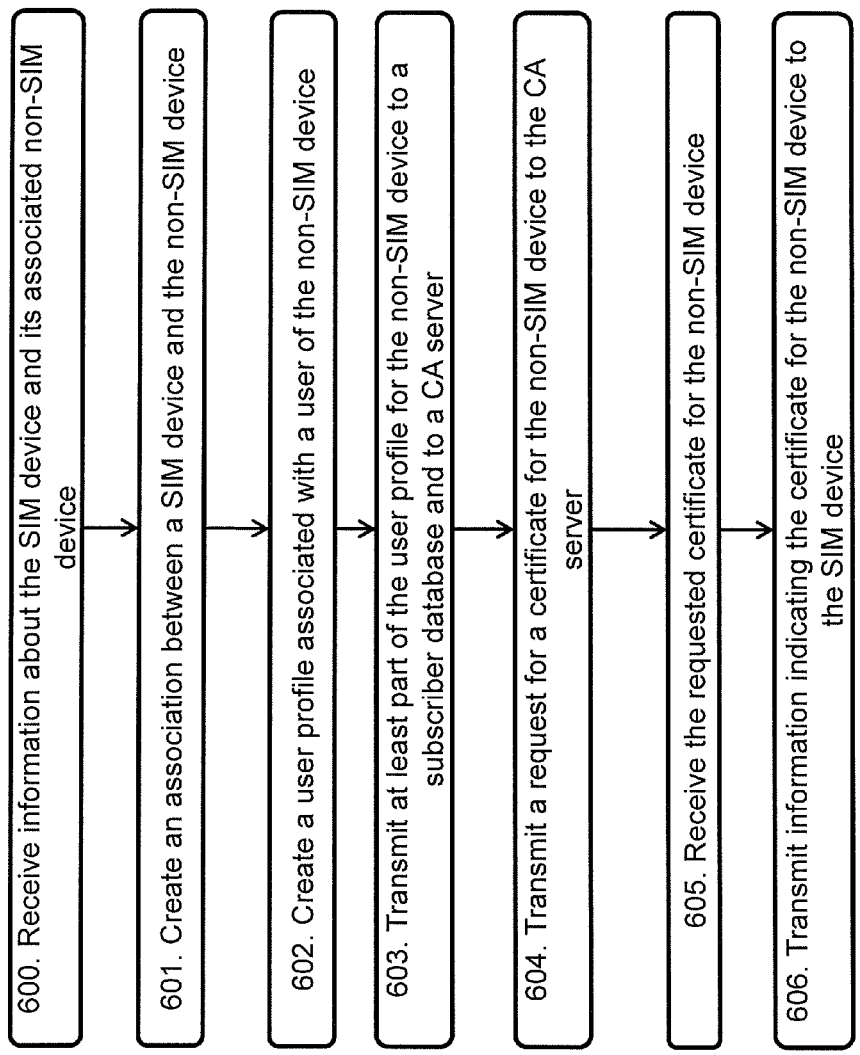

The method described above will now be described seen from the perspective of the AS 125. FIG. 6 is a flowchart describing the present method performed by the AS 125 for enabling a non-SIM device 101b to access the first network 100a via the second network 100b. In some embodiments, the first network 100a is a 3GPP network and the second network 100b is a Wi-Fi network. The method comprises at least some of the following steps to be performed by the AS 125:

Step 600

This step corresponds to step 202 in FIG. 2. In some embodiments, the AS 125 receives, from the SIM device 101a, information about the SIM device 101a and its associated non-SIM device 101b. The information received from the SIM device 101a may be user identities associated with the respective device, i.e. the user identity of the SIM device 101a and the user identity of the non-SIM device 101b. The SIM device 101a may have attached to the first network 100a before transmitting the information about the SIM device 101a and the non-SIM device 101b to the AS 125. The SIM device 101a may previously have received information about its associated non-SIM device 101b from the respective associated non-SIM device 101b. The SIM device 101a may be adapted to attach to the first network 100a.

Step 601

This step corresponds to step 203 in FIG. 2. The AS 125 creates an association between the SIM device 101a and the non-SIM device 101b. The association between the SIM device 101a and the non-SIM device 101b may be created by the AS 125 based on the information received from the SIM device 101a in step 600.

Step 602

This step corresponds to step 203 in FIG. 2. The AS 125 creates a user profile associated with the user of the non-SIM device 101b. The creation of the user profile may comprise creation of at least one of a virtual IMSI for the non-SIM device 101b, a default APN for the non-SIM device 101b and at least one PDN parameter for the non-SIM device 101b. The virtual IMSI may indicate that the non-SIM device 101b is a device which does not have a SIM, i.e. that it is a non-SIM device 101b. The virtual IMSI may be a non-SIM device ID uniquely identifying the user of the non-SIM device 101b.

Step 603

This step corresponds to step 204 and step 206 in FIG. 2. The AS 125 transmits at least part of the user profile for the non-SIM device 101b to a subscriber database 110 and to a CA server 115 to be used in authentication and authorization of the non-SIM device 101b to access the first network 100a via the second network 100b.

The AS 125 may further transmit information about the association of the non-SIM device 101b (e.g. user identity or device identity) and the SIM device 101a (e.g. IMSI), and non-SIM user info (e.g. password for EAP-TTLS/PEAP authentication method, user policy, etc.) to the AAA server 113 or any other external database.

Step 604

This step corresponds to step 208 in FIG. 2. In some embodiments, the AS 125 transmits a request for a certificate for the non-SIM device 101b to the CA server 115.

Step 605

This step corresponds to step 210 in FIG. 2. In some embodiments, the AS 125 receives, from the CA server 115, the requested certificate for the non-SIM device 101b.

Step 606

This step corresponds to step 211 in FIG. 2. In some embodiments, the AS 125 transmits information indicating the certificate for the non-SIM device 101b to the SIM device 101a.

Figure 7:
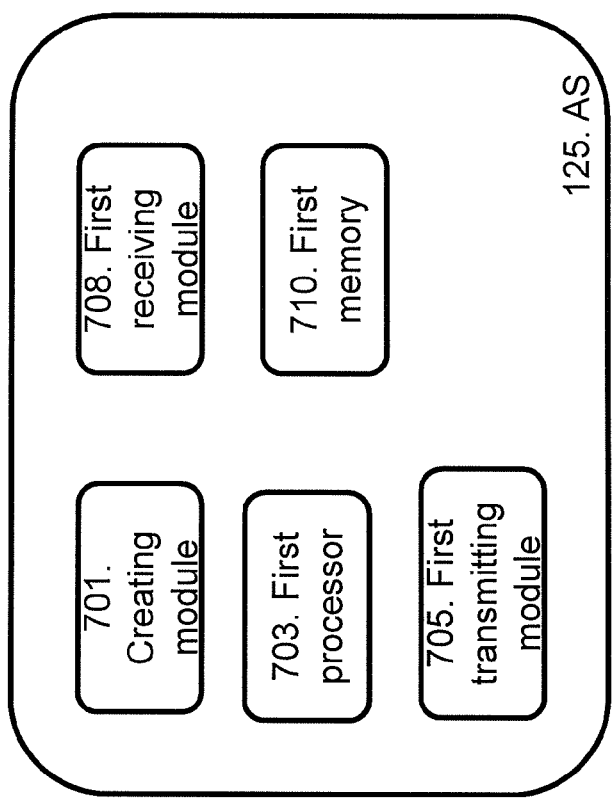

Embodiments of the AS 125 configured to perform the method steps, as described above in relation to FIGS. 2, 3 4, 5 and 6 is depicted in FIG. 7. As mentioned earlier, the first network 100a may be a 3GPP network and the second network 100b may be a Wi-Fi network.

The AS 125 is adapted to, e.g. by means of a creating module 701, create an association between the SIM device 101a and the non-SIM device 101b and to create a user profile associated with the user of the non-SIM device 101b. The creation of the user profile may comprise creation of at least one of a virtual IMSI for the non-SIM device 101b, a default APN for the non-SIM device 101b and a PDN parameter for the non-SIM device 101b. The virtual IMSI may indicate that the non-SIM device 101b is a device which does not have a SIM. The creating module 701 may also be referred to as a creating unit, a creating means, a creating circuit or means for creating. The creating module 701 may be a first processor 703 of the AS 125. In some embodiments, the creating module 701 may be referred to as a generating module.

The AS 125 is adapted to, e.g. by means of a first transmitting module 705, transmit at least part of the user profile for the non-SIM device 101b to a subscriber database 110 and to a CA server 115 to be used in authentication and authorization of the non-SIM device 101b to access the first network 100a via the second network 100b. The first transmitting module 705 may also be referred to as a first transmitting unit, a first transmitting means, a first transmitting circuit, first means for transmitting or a first output unit. The first transmitting module 705 may be a transmitter, a transceiver etc. The first transmitting module 705 may be a wireless transmitter of the AS 125 of a wireless or fixed communications system.

The AS 125 may be adapted to, e.g. by means of the first transmitting module 705, transmit a request for a certificate for the non-SIM device 101b to the CA server 115. The AS 125 may be adapted to, e.g. by means of a first receiving module 708, receive, from the CA server 115, the requested certificate for the non-SIM device 101b. The first receiving module 708 may also be referred to as a first receiving unit, a first receiving means, a first receiving circuit, first means for receiving or a first input unit. The first receiving module 708 may be a receiver, a transceiver etc. The first receiving module 708 may be a wireless receiver of the AS 125 of a wireless or fixed communications system.

The AS 125 may be adapted to, e.g. by means of the first transmitting module 705, transmit information indicating the certificate for the non-SIM device 101b to the SIM device 101a.

The AS 125 may be adapted to, e.g. by means of the first receiving module 708, receive, from the SIM device 101a, information about the SIM device 101a and its associated non-SIM device 101b. The association between the SIM device 101a and the non-SIM device 101b is created by the AS 125 based on the information received from the SIM device 101a. The information received from the SIM device 101a may be user identities associated with the respective device, i.e. the SIM device 101a and the non-SIM device 101b.

The AS 125 may further comprise a first memory 710 comprising one or more memory units. The first memory 710 is arranged to be used to store data, received data streams, power level measurements, information about SIM devices 101a and non-SIM devices 101b, associations, user data, user profiles, certificates, threshold values, time periods, configurations, schedulings, and applications to perform the methods herein when being executed in the AS 125.

In some embodiments, the AS 125 comprises the first processor 703 and the first memory 710. The first memory 710 comprises instructions executable by the first processor 703.

Those skilled in the art will also appreciate that creating module 701, the first transmitting module 705 and the first receiving module 708 described above may refer to a combination of analog and digital circuits, and/or one or more processors configured with software and/or firmware, e.g. stored in a memory such as the first memory 710 seen in FIG. 7, that when executed by the one or more processors such as the first processor 703 perform as described below.

In some embodiments, a first computer program may comprise instructions which, when executed on at least one processor, cause the at least one processor to carry out at least one of the steps in FIGS. 2, 3, 4, 5 and 6. A first carrier may comprise the first computer program, and the first carrier is one of an electronic signal, optical signal, radio signal or computer readable storage medium.

Figure 8:
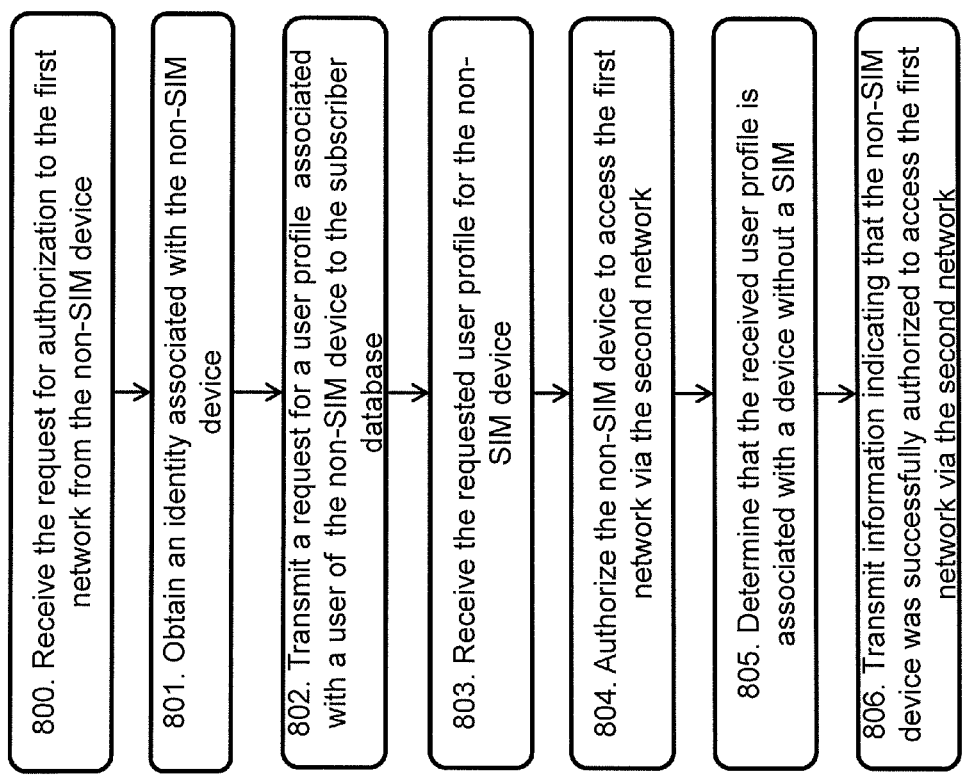
FIG. 8 is a flow chart illustrating embodiments of a method performed by an AAA server.

The method described above will now be described seen from the perspective of the AAA server 113. FIG. 8 is a flowchart describing the present method performed by the AAA server 113 for enabling authorization of a non-SIM device 101b to access a first network 100a via a second network 100b. The method comprises at least some of the following steps to be performed by the AAA server 113:

Step 800

This step corresponds to step 301 in FIG. 3. In some embodiments, the AAA server 113 receives a request for authorization to the first network 100a from the non-SIM device 101b. The request comprises information identifying the non-SIM device 101b.

Step 801

This step corresponds to step 302 in FIG. 3. Based on a request for authorization to the first network 100a from the non-SIM device 101b, the AAA server 113 obtains an identity associated with the non-SIM device 101b.

Step 802

This step corresponds to step 303 in FIG. 3. The AAA server 113 transmits a request for a user profile associated with a user of the non-SIM device 101b to the subscriber database 110. The request comprises the obtained identity for the non-SIM device 101b.

Step 803

This step corresponds to step 304 in FIG. 3. The AAA server 113 receives, from the subscriber database 110, the requested user profile for the non-SIM device 101b.

Step 804

This step corresponds to step 304 in FIG. 3. Based on the received user profile, the AAA server 113 authorizes the non-SIM device 101b to access the first network 100a via the second network 100b. In some embodiments, the non-SIM device 101b is authorized to access the first network 100a via the second network 100b when the user profile is associated with a device without a SIM. The first network 100a may be a 3GPP network and the second network 100b may be a Wi-Fi network.

Step 805

This step corresponds to step 305 in FIG. 3. In some embodiments, the AAA server 113 determines that the received user profile is associated with a device without a SIM.

Step 806

This step corresponds to step 306 in FIG. 3. In some embodiments, the AAA server 113 transmits information indicating that the non-SIM device 101b was successfully authorized to access the first network 100a via the second network 100b.

Figure 9:
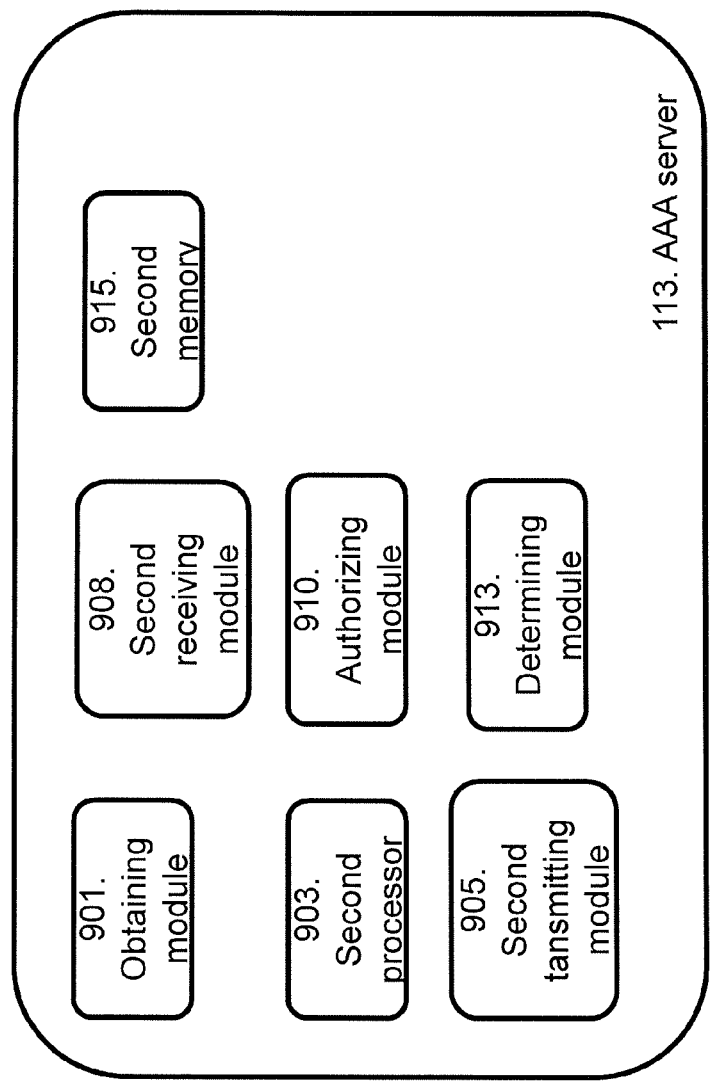
FIG. 9 is a schematic block diagram illustrating embodiments of an AAA server.

Embodiments of the AAA server 113 configured to perform the method steps, as described above in relation to FIGS. 2, 3 4, 5 and 8 is depicted in FIG. 9.

The AAA server 113 is adapted to, e.g. by means of an obtaining module 901, based on a request for authorization to the first network 100a from the non-SIM device 101b, obtain an identity associated with the non-SIM device 101b. The obtaining module 901 may be a second processor 903 of the AAA server 113. The obtaining module 901 may also be referred to as an obtaining unit, an obtaining means, an obtaining circuit, means for obtaining etc.

The AAA server 113 is adapted to, e.g. by means of a second transmitting module 905, transmit a request for a user profile associated with a user of the non-SIM device 101b to the subscriber database 110. The request comprises the obtained identity for the non-SIM device 101b. The second transmitting module 905 may also be referred to as a second transmitting unit, a second transmitting means, a second transmitting circuit, second means for transmitting, a second output unit etc. The second transmitting module 905 may be a transmitter, a transceiver etc. The second transmitting module 905 may be a wireless transmitter of the AAA server 113 of a wireless or fixed communications system.

The AAA server 113 is adapted to, e.g. by means of a second receiving module 908, receive, from the subscriber database 110, the requested user profile for the non-SIM device 101b. The second receiving module 908 may also be referred to as a second receiving unit, a second receiving means, a second receiving circuit, second means for receiving, second input unit etc. The second receiving module 908 may be a receiver, a transceiver etc. The second receiving module 908 may be a wireless receiver of the AAA server 113 of a wireless or fixed communications system.

The AAA server 113 is adapted to, e.g. by means of an authorizing module 910, based on the received user profile, authorize the non-SIM device 101b to access the first network 100a via the second network 100b. The first network 100a may be a 3GPP network and the second network 100b is a Wi-Fi network. The non-SIM device 101b may be arranged to be authorized to access the first network 100a via the second network 100b when the user profile is associated with a device without a SIM. The authorizing module 910 may be the second processor 903 of the AAA server 113. The authorizing module 910 may also be referred to as an authorizing unit, an authorizing means, an authorizing circuit, means for authorizing etc.

In some embodiments, the AAA server 113 is adapted to, e.g. by means of the second transmitting module 905, transmit information indicating that the non-SIM device 101b was successfully authorized to access the first network 101a via the second network 101b.

The AAA server 113 may be adapted to, e.g. by means of a determining module 913, determine that the received user profile is associated with a device without a SIM. The determining module 913 may be the second processor 903 of the AAA server 113. The determining module 913 may also be referred to as a determining unit, a determining means, a determining circuit, means for determining etc.

In some embodiments, the AAA server 113 is adapted to, e.g. by means of the second receiving module 908, receive the request for authorization to the first network 100a from the non-SIM device 101b. The request comprises information identifying the non-SIM device 101b.

The AAA server 113 may further comprise a second memory 915 comprising one or more memory units. The second memory 915 is arranged to be used to store data, received data streams, power level measurements, information about SIM devices 101a and non-SIM devices 101b, associations, user data, user profiles, certificates, threshold values, time periods, configurations, schedulings, and applications to perform the methods herein when being executed in the AAA server 113.

In some embodiments, the AAA server 113 comprises the second processor 903 and the second memory 915. The second memory 915 comprises instructions executable by the second processor 903.

Those skilled in the art will also appreciate that obtaining module 901, the second transmitting module 905, the second receiving module 908, the authorizing module 910 and the determining module 913 as described above may refer to a combination of analog and digital circuits, and/or one or more processors configured with software and/or firmware, e.g. stored in a memory (e.g. the second memory 915 seen in FIG. 9), that when executed by the one or more processors such as the second processor 903.

In some embodiments, a second computer program may comprise instructions which, when executed on at least one processor, cause the at least one processor to carry out at least one of the steps in FIGS. 2, 3, 4, 5 and 8. A second carrier may comprise the second computer program, and the second carrier is one of an electronic signal, optical signal, radio signal or computer readable storage medium.

Figure 10:
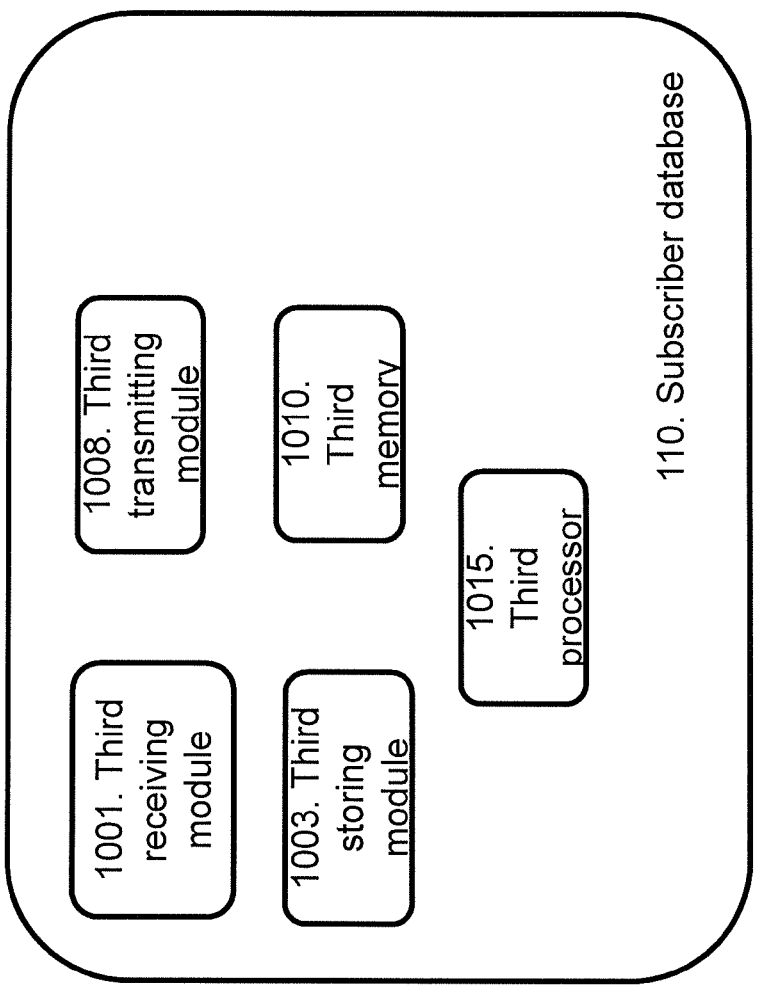
FIG. 10 is a schematic block diagram illustrating embodiments of a subscriber database.

Embodiments of the subscriber database 110 configured to perform the method actions, as described above in relation to FIGS. 2, 3 4, and 5 is depicted in FIG. 10.

The subscriber database 110 may be adapted to, e.g. by means of a third receiving module 1001, receive, from the AS 125, information indicating the user profile for the non-SIM device 101b. The third receiving module 1001 may also be referred to as a third receiving unit, a third receiving means, a third receiving circuit, third means for receiving or a third input unit. The third receiving module 1001 may be a receiver, a transceiver etc. The third receiving module 1001 may be a wireless receiver of the subscriber database 110 of a wireless or fixed communications system.

The subscriber database 110 may be adapted to, e.g. by means of a third storing module 1003, store the information indicating the user profile for the non-SIM device 101b. The third storing module 1003 may also be referred to as a third storing unit, a third storing means, a third storing circuit, third means for storing etc.

The subscriber database 110 may be adapted to, e.g. by means of the third receiving module 1001, receive a request for the user profile for the non-SIM device 101b from the AAA server 113.

The subscriber database 110 may be adapted to, e.g. by means of a third transmitting module 1008, transmit, to the AAA server 113, the user profile for the non-SIM device 101b as requested. The third transmitting module 1008 may also be referred to as a third transmitting unit, a third transmitting means, a third transmitting circuit, third means for transmitting or a third output unit. The third transmitting module 1008 may be a transmitter, a transceiver etc. The third transmitting module 1008 may be a wireless transmitter of the subscriber database 110 of a wireless or fixed communications system.

The subscriber database 110 may further comprise a third memory 1010 comprising one or more memory units. The third memory 1010 is arranged to be used to store data, received data streams, power level measurements, information about SIM devices 101a and non-SIM devices 101b, associations, user data, user profiles, certificates, threshold values, time periods, configurations, schedulings, and applications to perform the methods herein when being executed in the subscriber database 110.

In some embodiments, the subscriber database 110 comprises a third processor 1015 and the third memory 1010. The third memory 1010 comprises instructions executable by the third processor 1015.

Those skilled in the art will also appreciate that the third receiving module 1001, the storing module 1003 and the third transmitting module 1008 as described above may refer to a combination of analog and digital circuits, and/or one or more processors configured with software and/or firmware, e.g. stored in a memory (e.g. the third memory 1010), that when executed by the one or more processors such as the third processor 1015.

Figure 11:
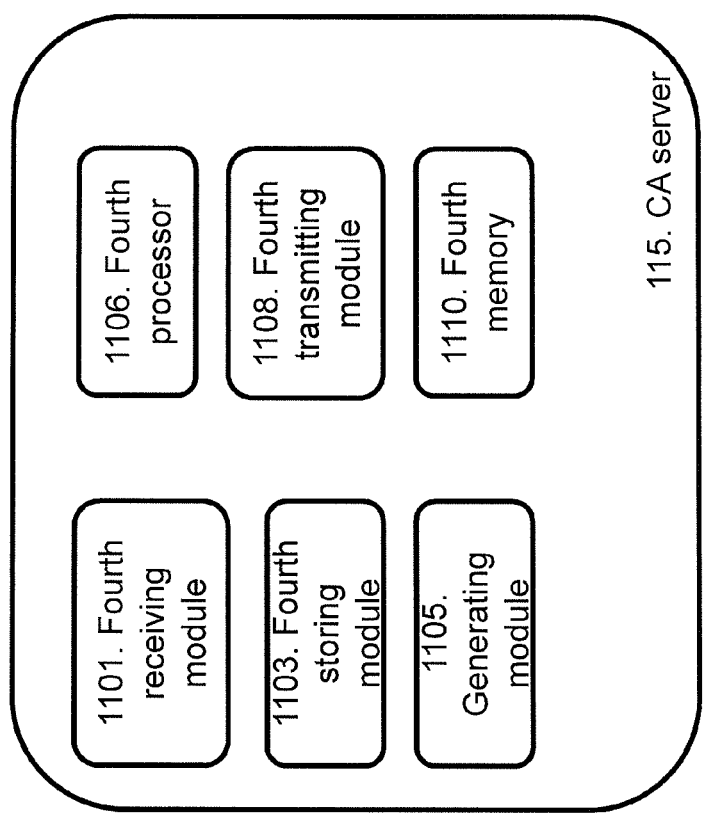
FIG. 11 is a schematic block diagram illustrating embodiments of a CA server.

Embodiments of the CA server 115 configured to perform the method actions, as described above in relation to FIGS. 2, 3 4, and 5 is depicted in FIG. 11.

The CA server 115 may be adapted to, e.g. by means of a fourth receiving module 1101, receive, from the AS 125, information indicating the user data for the non-SIM device 101b. The fourth receiving module 1101 may also be referred to as a fourth receiving unit, a fourth receiving means, a fourth receiving circuit, fourth means for receiving, fourth input unit etc. The fourth receiving module 1101 may be a receiver, a transceiver etc. The fourth receiving module 1101 may be a wireless receiver of the CA server 115 of a wireless or fixed communications system.

The CA server 115 may be adapted to, e.g. by means of a fourth storing module 1103, store the received user data for the non-SIM device 101b. The fourth storing module 1103 may also be referred to as a fourth storing unit, a fourth storing means, a fourth storing circuit, fourth means for storing, etc.

The CA server 115 may be adapted to, e.g. by means of the fourth receiving module 1101, receive a request for a certificate for the non-SIM device 101b from the AS 125.

The CA server 115 may be adapted to, e.g. by means of a generating module 1105, generate a certificate for the non-SIM device 101b. The generating module 1105 may be a fourth processor 1106 of the CA server 115. The generating module 1105 may also be referred to as a generating unit, a generating means, a generating circuit, means for generating, etc.

The CA server 115 may be adapted to, e.g. by means of a fourth transmitting module 1108, transmit, to the AS 125, the certificate for the non-SIM device 101b. The fourth transmitting module 1108 may also be referred to as a fourth transmitting unit, a fourth transmitting means, a fourth transmitting circuit, fourth means for transmitting, fourth output unit etc. The fourth transmitting module 1108 may be a transmitter, a transceiver etc. The fourth transmitting module 1108 may be a wireless transmitter of the CA server 115 of a wireless or fixed communications system.

The CA server 115 may further comprise a fourth memory 1110 comprising one or more memory units. The fourth memory 1110 is arranged to be used to store data, received data streams, power level measurements, information about SIM devices 101a and non-SIM devices 101b, associations, user data, user profiles, certificates, threshold values, time periods, configurations, schedulings, and applications to perform the methods herein when being executed in the CA server 115.

In some embodiments, the CA server 115 comprises the fourth processor 1106 and the fourth memory 1110. The fourth memory 1110 comprises instructions executable by the fourth processor 1106.

Those skilled in the art will also appreciate that the fourth receiving module 1101, the fourth storing module 1103, the generating module 1105 and the fourth transmitting module 1108 as described above may refer to a combination of analog and digital circuits, and/or one or more processors configured with software and/or firmware, e.g. stored in a memory (e.g. the fourth memory 1110), that when executed by the one or more processors such as the fourth processor 1106.

The present mechanism for enabling a non-SIM device 101b to access a first network 100a via a second network 100b may be implemented through one or more processors, such as the first processor 703 in the AS arrangement depicted in FIG. 7, the second processor 903 in the AAA server arrangement depicted in FIG. 9, the third processor 1015 in the subscriber database arrangement depicted in FIG. 10 and the fourth processor 1106 in the CA server arrangement depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the AS 125, the AAA server 113, the subscriber database 110 and the CA server 115. One such carrier may be in the form of a CD ROM disc. It is however feasible with other data carriers such as a memory stick. The computer program code can furthermore be provided as pure program code on a server and downloaded to at least one of the AS 125, the AAA server 113, the subscriber database 110 and the CA server 115.

The embodiments herein provide Wi-Fi authentication, authorization support for a non-SIM device 101b to access 3GPP/EPC service. In other words, providing Wi-Fi integration with 3GPP/EPC.

With the embodiments herein, the operator associated with the first network 100a may define different subscriptions (different APN, QoS profile, charging characteristics, APN restriction, etc.) in the subscriber database 110 for the non-SIM device 101b and the SIM device 101a.

An indication of the type of device, i.e. non-SIM or SIM, may be added in the EPC/GRPS subscription in the subscriber database 110 for the non-SIM device 101b and the SIM device 101a.

The embodiments herein may provide a solution for a non-SIM device 101b to access the EPC through the Wi-Fi access network. Furthermore, the embodiments herein may enable Voice over Wi-Fi (VoWiFi) for the non-SIM device 101b.

One network (3GPP Network supporting 2G, 3G, 4G, IMS and now also Wi-Fi)) serves the new access type (Wi-Fi) in addition to the specified accesses (e.g. 2G, 3G and 4G) in 3GPP. For entitlement, it may be used for registration of devices (e.g. non-SIM devices 101b) to user subscription in the network as well as assigning the proper service (e.g. voice over Wi-Fi) for such device.

The embodiments herein introduce the AS 125 which may be located in an operator domain (e.g. a specific APN) for the device registration, association with a non-SIM device(s) 101b. The AS 125 creates profile data for the non-SIM device 101b, e.g. a virtual IMSI, a default APN, a PDN parameter etc. The AS 125 provisions the user profiles into the subscriber database 110 and the CA server 115 in order to generate a certificate for the non-SIM device 101b.

EAP-TLS may be an example algorithm for Wi-Fi authentication of non-SIM devices 101b from a security aspect, other examples may be EAP-TTLS and/or PEAP. Different from the legacy SIM/USIM based authentication procedure, the AAA server 113 and the CA server 115 is fully responsible for the non-SIM based authentication.

The subscriber database 110 may not necessarily be involved in the Wi-Fi authentication procedure of the non-SIM device 101b. The subscriber database 110 may be used as a centralized user database to manage the user profile irrespective of the Radio Access Technology (RAT) type (i.e. LTE/4G or Wi-Fi), the user access, and location management in the sense.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "configured to" used herein may also be referred to as "arranged to" or "adapted to" or "operable to" etc.

It should also be emphasised that the steps of the methods defined in the appended claims may, without departing from the embodiments herein, be performed in another order than the order in which they appear herein.

What is claimed is:

1. A method performed by an Authentication, Authorization, and Accounting, AAA, server for enabling a non-Subscriber Identity Module, non-SIM, device to access a first network via a second network, the method comprising:
    based on a request for authorization to the first network from the non-SIM device, obtaining an identity associated with the non-SIM device;
    transmitting a request for a user profile associated with a user of the non-SIM device to the subscriber database, which request comprises the obtained identity for the non-SIM device;
    receiving, from the subscriber database, the requested user profile for the non-SIM device, wherein the requested user profile for the non-SIM device is associated with a SIM device; and based on the received user profile, authorizing the non-SIM device to access the first network via the second network.

2. The method according to claim 1, further comprising: transmitting information indicating that the non-SIM device was successfully authorized to access the first network via the second network.

3. The method according to claim 1, further comprising: determining that the received user profile is associated with a device without a SIM; and
wherein the non-SIM device is authorized to access the first network via the second network when the user profile is associated with a device without a SIM.

4. The method according to claim 1, further comprising: receiving the request for authorization to the first network from the non-SIM device, wherein the request comprises information identifying the non-SIM device.

5. The method according to claim 1, wherein the first network is a Third Generation Partnership Project, 3GPP, network and the second network is a Wi-Fi network.

6. A method performed by an Application Server, AS, for enabling a non-Subscriber Identity Module, non-SIM, device to access a first network via a second network, the method comprising:
creating an association between a SIM device and the non-SIM device;
creating a user profile associated with a user of the non-SIM device; and
transmitting at least part of the user profile for the non-SIM device to a subscriber database and to a Certificate Authority, CA, server to be used in authentication and authorization of the non-SIM device to access the first network via the second network.

7. The method according to claim 6, further comprising: transmitting a request for a certificate for the non-SIM device to the CA server;
receiving, from the CA server, the requested certificate for the non-SIM device; and
transmitting information indicating the certificate for the non-SIM device to the SIM device.

8. The method according to claim 6, further comprising: receiving, from the SIM device, information about the SIM device and its associated non-SIM device; and
wherein the association between the SIM device and the non-SIM device is created by the AS based on the information received from the SIM device.

9. The method according to claim 8, wherein the information received from the SIM device is user identities associated with the SIM device and the non-SIM device.

10. The method according to claim 6, wherein the creation of the user profile comprises creation of at least one of a virtual International Mobile Subscriber Identity, IMSI, for the non-SIM device, a default Access Point Name, APN, for the non-SIM device and a Packet Data Network, PDN, parameter for the non-SIM device.

11. The method according to claim 10, wherein the virtual IMSI indicates that the non-SIM device is a device which does not have a SIM.

12. The method according to claim 6, wherein the first network is a Third Generation Partnership Project, 3GPP, network and the second network is a Wi-Fi network.

13. An Authentication, Authorization, and Accounting, AAA, server for enabling a non-Subscriber Identity Module, non-SIM, device to access a first network via a second network, the AAA server being arranged to:

based on a request for authorization to the first network from the non-SIM device, obtain an identity associated with the non-SIM device;
transmit a request for a user profile associated with a user of the non-SIM device to the subscriber database, which request comprises the obtained identity for the non-SIM device;
receive, from the subscriber database, the requested user profile for the non-SIM device, wherein the requested user profile for the non-SIM device is associated with a SIM device; and to
based on the received user profile, authorize the non-SIM device to access the first network via the second network.

14. The AAA server according to claim 13, being further arranged to:
transmit information indicating that the non-SIM device was successfully authorized to access the first network via the second network.

15. The AAA server according to claim 13, being further arranged to:
determine that the received user profile is associated with a device without a SIM; and
wherein the non-SIM device is arranged to be authorized to access the first network via the second network when the user profile is associated with a device without a SIM.

16. The AAA server according to claim 13, being further arranged to:
receive the request for authorization to the first network from the non-SIM device, wherein the request comprises information identifying the non-SIM device.

17. The AAA server according to claim 13, wherein the first network is a Third Generation Partnership Project, 3GPP, network and the second network is a Wi-Fi network.

18. An Application Server, AS, for enabling a non-Subscriber Identity Module, non-SIM, device to access a first network via a second network, the AS being arranged to:
create an association between a SIM device and the non-SIM device;
create a user profile associated with the user of the non-SIM device; and
transmitting at least part of the user profile for the non-SIM device to a subscriber database and to a Certificate Authority, CA, server to be used in authentication and authorization of the non-SIM device to access the first network via the second network.

19. The AS according to claim 18, being further arranged to:
transmit a request for a certificate for the non-SIM device to the CA server;
receive, from the CA server, the requested certificate for the non-SIM device; and to
transmit information indicating the certificate for the non-SIM device to the SIM device.

20. The AS according to claim 18, being further arranged to:
receive, from the SIM device, information about the SIM device and its associated non-SIM device; and
wherein the association between the SIM device and the non-SIM device is created by the AS based on the information received from the SIM device.

21. The AS according to claim 20, wherein the information received from the SIM device is user identities associated with the SIM device and the non-SIM device.

22. The AS according to claim 18, wherein the creation of the user profile comprises creation of at least one of a virtual International Mobile Subscriber Identity, IMSI, for the non-SIM device, a default Access Point Name, APN, for the non-SIM device and a Packet Data Network, PDN, parameter for the non-SIM device.

23. The AS according to claim 22, wherein the virtual IMSI indicates that the non-SIM device is a device which does not have a SIM.

24. The AS according to claim 18, wherein the first network is a Third Generation Partnership Project, 3GPP, network and the second network is a Wi-Fi network.

25. A first computer program product comprising a non-transitory computer readable medium storing a first computer program comprising instructions that, when executed on at least one processor, cause the at least one processor to carry out the method according to claim 1.

26. A second compute program product comprising a non-transitory computer readable medium storing a second computer program comprising instructions that, when executed on at least one processor, cause the at least one processor to carry out the method according to claim 6.

27. A method for enabling a non-Subscriber Identity Module, non-SIM, device to access a first network via a second network, the method comprising:
    creating, at an Application Server, AS, an association between a SIM device and the non-SIM device;
    creating, at the AS, a user profile associated with a user of the non-SIM device;
    transmitting at least part of the user profile for the non-SIM device from the AS to a subscriber database and to a Certificate Authority, CA, server to be used in authentication and authorization of the non-SIM device to access the first network via the second network;
    based on a request for authorization to the first network from the non-SIM device to an Authentication, Authorization, and Accounting, AAA, server,
    obtaining, at the AAA server, an identity associated with the non-SIM device;
    transmitting a request for a user profile associated with a user of the non-SIM device from the AAA server to the subscriber database, which request comprises the obtained identity for the non-SIM device;
    receiving, at the AAA server from the subscriber database, the requested user profile for the non-SIM device; and
    based on the received user profile, authorizing, at the AAA server, the non-SIM device to access the first network via the second network.

28. A communications system for enabling a non-Subscriber Identity Module, non-SIM, device to access a first network via a second network, the communications system comprises an Authentication, Authorization, and Accounting, AAA, server and an Application Server, AS, wherein the AAA server is arranged to:
    based on a request for authorization to the first network from the non-SIM device, obtain an identity associated with the non-SIM device;
    transmit a request for a user profile associated with a user of the non-SIM device to the subscriber database, which request comprises the obtained identity for the non-SIM device;
    receive, from the subscriber database, the requested user profile for the non-SIM device; and to
    based on the received user profile, authorize the non-SIM device to access the first network via the second network; and
    wherein the AS is arranged to:
    create an association between a SIM device and the non-SIM device;
    create a user profile associated with the user of the non-SIM device; and to
    transmitting at least part of the user profile for the non-SIM device to a subscriber database and to a Certificate Authority, CA, server to be used in authentication and authorization of the non-SIM device to access the first network via the second network.

* * * * *

UNITED STATES PATENT AND TRADEMARK OFFICE
CERTIFICATE OF CORRECTION

PATENT NO. : 9,648,019 B2  
APPLICATION NO. : 14/441460  
DATED : May 9, 2017  
INVENTOR(S) : Khello et al.

Page 1 of 2

It is certified that error appears in the above-identified patent and that said Letters Patent is hereby corrected as shown below:

In the Drawings

In Fig. 5, Sheet 6 of 12, delete Tag "105." and insert Tag -- 105b. --, therefor.

In the Specification

In Column 1, Lines 56-57, delete "EAP-AKA')" and insert -- (EAP-AKA') --, therefor.

In Column 5, Line 44, delete "(loT)" and insert -- (IoT) --, therefor.

In Column 8, Line 48, delete "HSS 105" and insert -- HSS 110 --, therefor.

In Column 8, Lines 52-53, delete "HSS 120," and insert -- HSS 110, --, therefor.

In Column 14, Line 1, delete "SIM device 101b)" and insert -- SIM device 101a) --, therefor.

In Column 14, Line 26, delete "EPC/GRPS" and insert -- EPC/GPRS --, therefor.

In Column 14, Line 31, delete "EPC/GRPS" and insert -- EPC/GPRS --, therefor.

In Column 18, Line 17, delete "FIGS. 2, 3 4," and insert -- FIGS. 2, 3, 4, --, therefor.

In Column 20, Line 20, delete "FIGS. 2, 3 4, 5" and insert -- FIGS. 2, 3, 4, 5 --, therefor.

In Column 21, Line 1-2, delete "first network 101a via the second network 101b." and insert -- first network 100a via the second network 100b. --, therefor.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,648,019 B2

In Column 21, Line 47, delete "FIGS. 2, 3 4," and insert -- FIGS. 2, 3, 4, --, therefor.

In Column 22, Line 34-35, delete "FIGS. 2, 3 4, and 5" and insert -- FIGS. 2, 3, 4, and 5 --, therefor.

In Column 23, Line 63, delete "EPC/GRPS" and insert -- EPC/GPRS --, therefor.

In Column 24, Line 5, delete "Wi-Fi))" and insert -- Wi-Fi) --, therefor.

In the Claims

In Column 27, Lines 15-16, in Claim 25, delete "comprising instructions that, when executed on at least one processor, cause" and insert -- comprising instructions executed on at least one processor, causing --, therefor.

In Column 27, Line 18, in Claim 26, delete "compute" and insert -- computer --, therefor.

In Column 27, Lines 20-21, in Claim 26, delete "comprising instructions that, when executed on at least one processor, cause" and insert -- comprising instructions executed on at least one processor, causing --, therefor.

In Column 27, Line 37, in Claim 27, delete "server," and insert -- server; --, therefor.